United States Patent [19]

Miu et al.

[11] 4,050,097
[45] Sept. 20, 1977

[54] SYNCHRONIZATION TECHNIQUE FOR DATA TRANSFERS OVER AN ASYNCHRONOUS COMMON BUS NETWORK COUPLING DATA PROCESSING APPARATUS

[75] Inventors: Ming T. Miu, Chelmsford; Virendra S. Negi, Pepperell; Richard A. Lemay, Bolton, all of Mass.

[73] Assignee: Honeywell Information Systems, Inc., Waltham, Mass.

[21] Appl. No.: 727,194

[22] Filed: Sept. 27, 1976

[51] Int. Cl.$^2$ .............................................. G06F 1/04
[52] U.S. Cl. ............................................................ 364/200
[58] Field of Search ............................... 364/200, 900

[56] References Cited

U.S. PATENT DOCUMENTS

| | | | |
|---|---|---|---|
| 3,668,650 | 6/1972 | Wang ........................... | 340/172.5 |
| 3,710,324 | 1/1973 | Cohen et al. ................. | 340/172.5 |
| 3,771,135 | 11/1973 | Huettner et al. ............. | 340/172.5 |
| 3,815,099 | 6/1974 | Cohen et al. ................. | 340/172.5 |
| 3,932,843 | 1/1976 | Trelut et al. ................. | 340/172.5 |
| 3,974,479 | 8/1976 | Kotok et al. ................. | 340/172.5 |

Primary Examiner—Mark E. Nusbaum
Attorney, Agent, or Firm—John S. Solakian; Ronald T. Reiling; Nicholas Prasinos

[57] ABSTRACT

Data transfer synchronization is achieved in a data processing system by a transferring unit enabling a clock cycle stall mechanism each time a transfer is attempted, disabling such mechanism upon receipt of a predetermined response from the receiving unit, the mechanism actually producing a clock cycle stall if such predetermined response is delayed beyond the duration of the clock cycle. Further, such stall mechanism is enabled in a receiving unit before the expected receipt of information, and actually produces a clock cycle stall if such response is so delayed.

12 Claims, 20 Drawing Figures

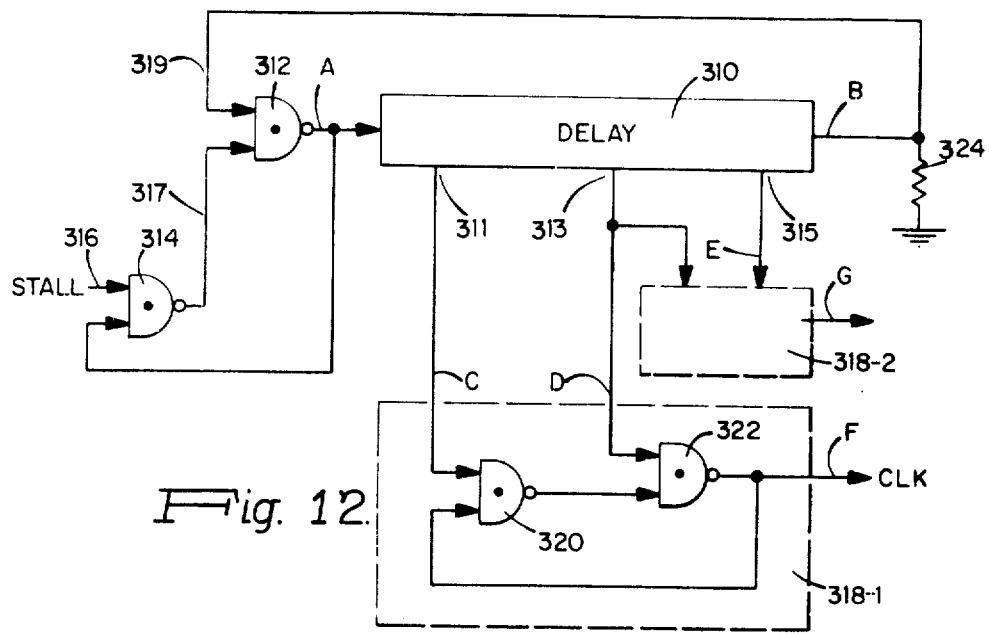
Fig. 12.
Fig. 13.
| IN 1 | IN 2 | OUT |
|---|---|---|
| 1 | 1 | 0 |
| 0 | 1 | 1 |
| 1 | 0 | 1 |
| 0 | 0 | 1 |
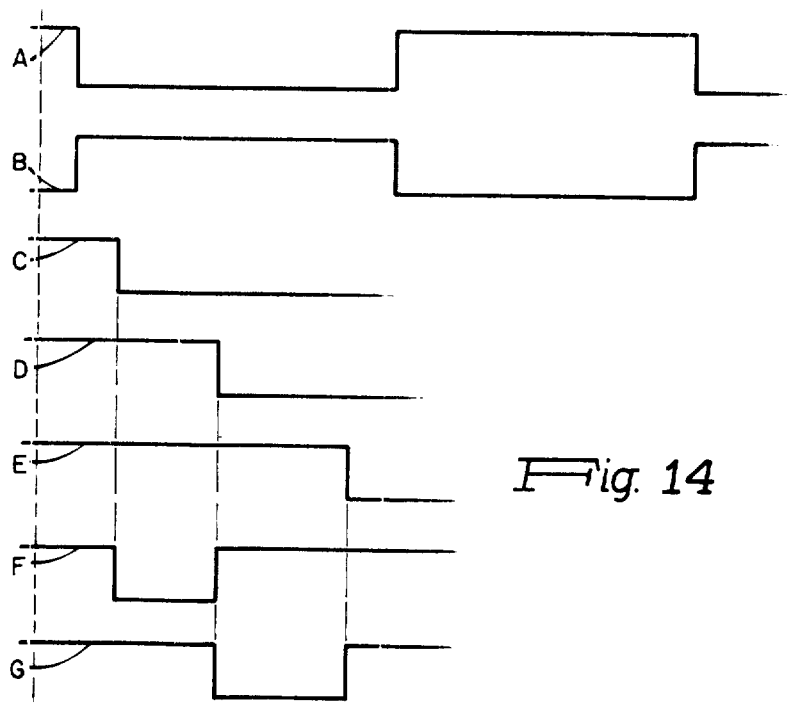
Fig. 14

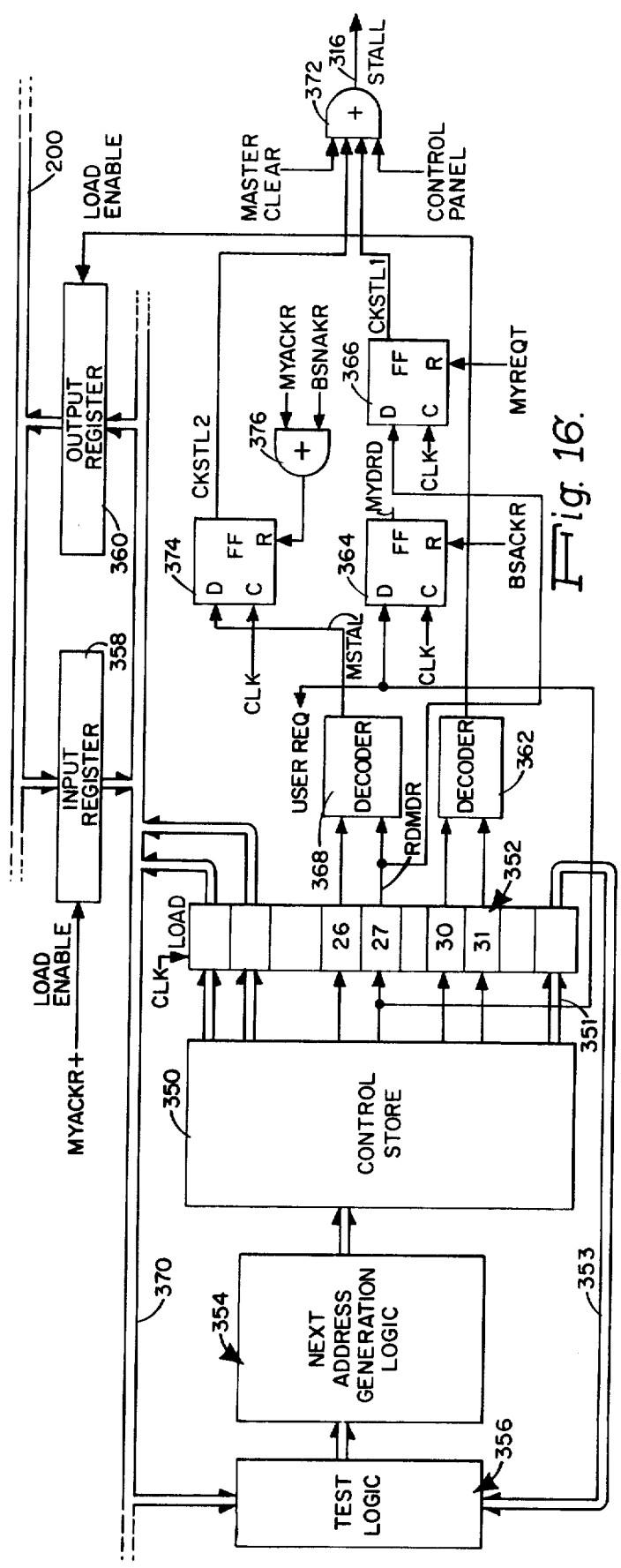

SYNCHRONIZATION TECHNIQUE FOR DATA TRANSFERS OVER AN ASYNCHRONOUS COMMON BUS NETWORK COUPLING DATA PROCESSING APPARATUS

BACKGROUND OF THE INVENTION

The present invention generally relates to data processing systems and more particularly relates to apparatus by which asynchronous transfers of information are synchronized.

In data processing systems, clock signals are utilized to strobe information into and out of various registers, arithmetic elements and the like which are included in the system. Data may be transferred between such elements and registers in a synchronous manner wherein transfers are only allowed at a specified time, i.e., at the time a clock pulse of a stream of repetitive clock pulses is present. In some systems, various transfers are provided in an asynchronous manner with the data so transferred not utilized until the system has ensured that such data has been so transferred and received. Some such systems include means for transferring a synchronizing clock pulse with the data so as to provide the synchronization required. Further systems provide a clock system by which synchronization is completed but only upon the occurrence of one of a plurality of clock pulses which are synchronous in nature and are not adaptive to the asynchronous transfer of information. That is to say, although the information is transferred in an asynchronous manner, the information cannot be so utilized in the system until a clock pulse has been so generated. In some instances wherein for example the data has been received just after a clock pulse has been generated, much time is wasted in synchronizing such data since it is not made available for use until the occurrence of the next clock pulse.

It is accordingly a primary object of the invention to provide apparatus for synchronizing the asynchronous transfer of information over a bus coupling a plurality of units in a data processing system including a stalling mechanism by which the synchronizing clock pulses may be delayed in order to adapt for the asynchronous transfers.

SUMMARY OF THE INVENTION

The above object and other objects are achieved in accordance with one embodiment of the invention by providing apparatus comprising clock logic having a control input and an output for generating a stream of clock pulses at the output, the clock logic including apparatus for inhibiting the generation of the clock pulses in response to the presence of a stall signal at the control input at a time when one of the clock pulses should have occurred, the stall signal having no effect on the generation of the clock pulses if the stall signal is received after the occurrence of the clock pulse and is no longer present at the time of the generation of the next one of the clock pulses, and wherein the invention includes a plurality of units including a first and second unit wherein the clock logic is included in the first unit. A common electrical bus is coupled with each of the units for enabling the transfer of information therebetween. Further apparatus is provided in the first unit for generating a first signal indicating a request for use of the bus and means for generating a second signal indicating the granting to the first unit of the use of the bus. Further apparatus is included in the first unit responsive to the second signal for transferring information over the bus to the second unit. Stall signal generator apparatus is also provided responsive to the first signal and the next occurring one of the clock pulses for generating a first stall signal. Apparatus is further provided for coupling the first stall signal for receipt by the control input of the clock logic and further apparatus is provided in the second unit which is responsive to the information transferred from the first unit for providing a positive acknowledgement over the bus to the first unit indicating that the second unit has accepted the information. Further, logic is included in the first unit which is responsive to the positive acknowledgement for disabling the stall signal generator apparatus thereby removing the first stall signal from the control input. Apparatus is further provided in the clock logic for enabling generation of a clock pulse in response to the removal of a stall signal from the control input.

BRIEF DESCRIPTION OF THE DRAWINGS

The manner in which the apparatus of the present invention is constructed and its mode of operation can best be understood in the light of the following detailed description, together with the accompanying drawings, in which:

FIG. 12 illustrates a clock system which may be used in combination with the present invention;

FIG. 13 illustrates a truth table for a well-known NAND gate;

FIG. 14 includes waveform illustrative of the operation of the apparatus of FIG. 12;

FIGS. 15A, 15B and 15C illustrate the asynchronous flow of operations for read and write opcodes;

FIG. 16 illustrates apparatus of the asynchronous to synchronous interface of the present invention;

DETAILED DESCRIPTION OF THE PREFERRED EMBODIMENT

The synchronization apparatus of the present invention is described primarily with respect to FIGS. 15A, 15B, 15C, 16, 17 and 18. Prior to such discussion however, the background of the present invention, including the system in which it is used, the logic for interfacing the present invention, and a typical clock system which may be used in association with the present invention, are first discussed. The system architecure for the bus network described herein is also described in U.S. Pat. No. 3,993,981, issued on Nov. 23, 1976.

Figure 1:
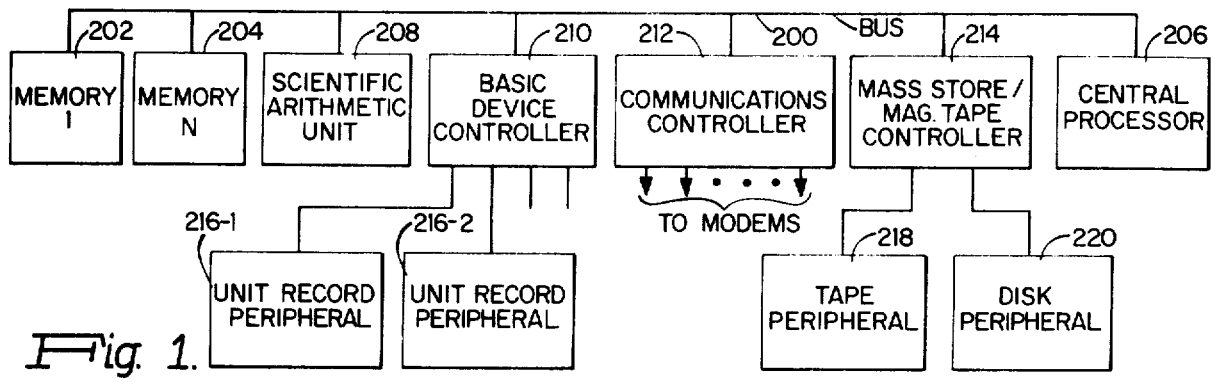
FIG. 1 is a general block diagram ilustration of a representative system in which the present invention may be included.

The data processing bus used with the present invention provides a communication path between two units in the system. The bus is asynchronous in design enabling units of various speeds connected to the bus to operate efficiently in the same system. The design of the bus permits communications including memory transfers, interrupts, data, status, and command transfer. The overall configuration of a typical system is shown in FIG. 1.

The bus permits any two units to communicate with each other at a given time via a common (shared) signal path. Any unit wishing to communicate, requests a bus cycle. When that bus cycle is granted, that unit becomes the master and may address any other unit in the system as the slave. Most transfers are in the direction of master to slave. Some types of bus interchange require a response cycle (read memory for example). In cases where a response cycle is required, the requestor assumes the role of the master, indicates that a response is required, and identifies itself to the slave. When the required information becomes available, (depending on slave response time), the slave now assumes the role of the master, and initiates a transfer to the requesting unit. This completes the interchange which has taken two bus cycles in this case. Intervening time on the bus between these two cycles may be used for other system traffic not involving these two units.

Figure 2:
FIGS. 2 through 6 illustrate the format of various information transferred over the common bus of the representative system.
Figure 3:
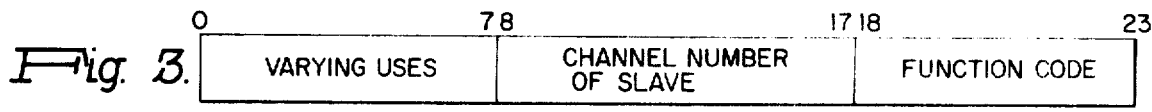

A master may address any other unit on the bus as a slave. It does this by placing the slave address on the address leads. There may be 24 address leads for example which can have either of two interpretations depending on the state of an accompanying control lead, called the memory reference signal (BSMREF-. If the memory reference signal is a binary ZERO, the format of FIG. 2 applies to the address leads with the 23rd such lead being the least significant bit. It should be noted that as used in this specification, the terms binary ZERO and binary ONE are used respectively to refer to the low and high states of electrical signals. If the memory reference signal is a binary ONE, the format for such 24 bits as shown in FIG. 3 applies. In essence, when the memory is being addressed, the bus enables up to $2^{24}$ bytes to be directly addressed in memory. When units are passing control information, data or interrupts, they address each other by channel number. The channel number allows up to $2^{10}$ channels to be addressed by the bus. Along with the channel number, a six bit function code is passed which specifies which of up to $2^6$ possible functions this transfer implies.

Figure 4:
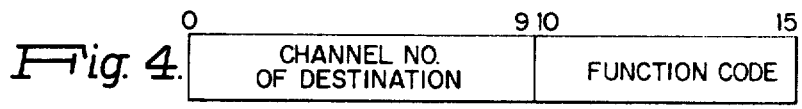

When a master requires a response cycle from the slave, it indicates this to the slave by one state (read command) of a control lead named BSWRITE— (the other state thereof not requiring a response, i.e. a write command). In addition, the master may provide its own identity to the slave by means of a channel number. The data leads, as opposed to the bus address leads, are coded in accordance with the format of FIG. 4, to indicate the master's identity when a response is required from the slave. The response cycle is directed to the requestor by a non-memory reference transfer. The control lead, indicated as a second-half bus cycle (BSSHBC—), is enabled to designate that this is the awaited cycle (as compared to an unsolicited transfer from another unit).

Figure 8:
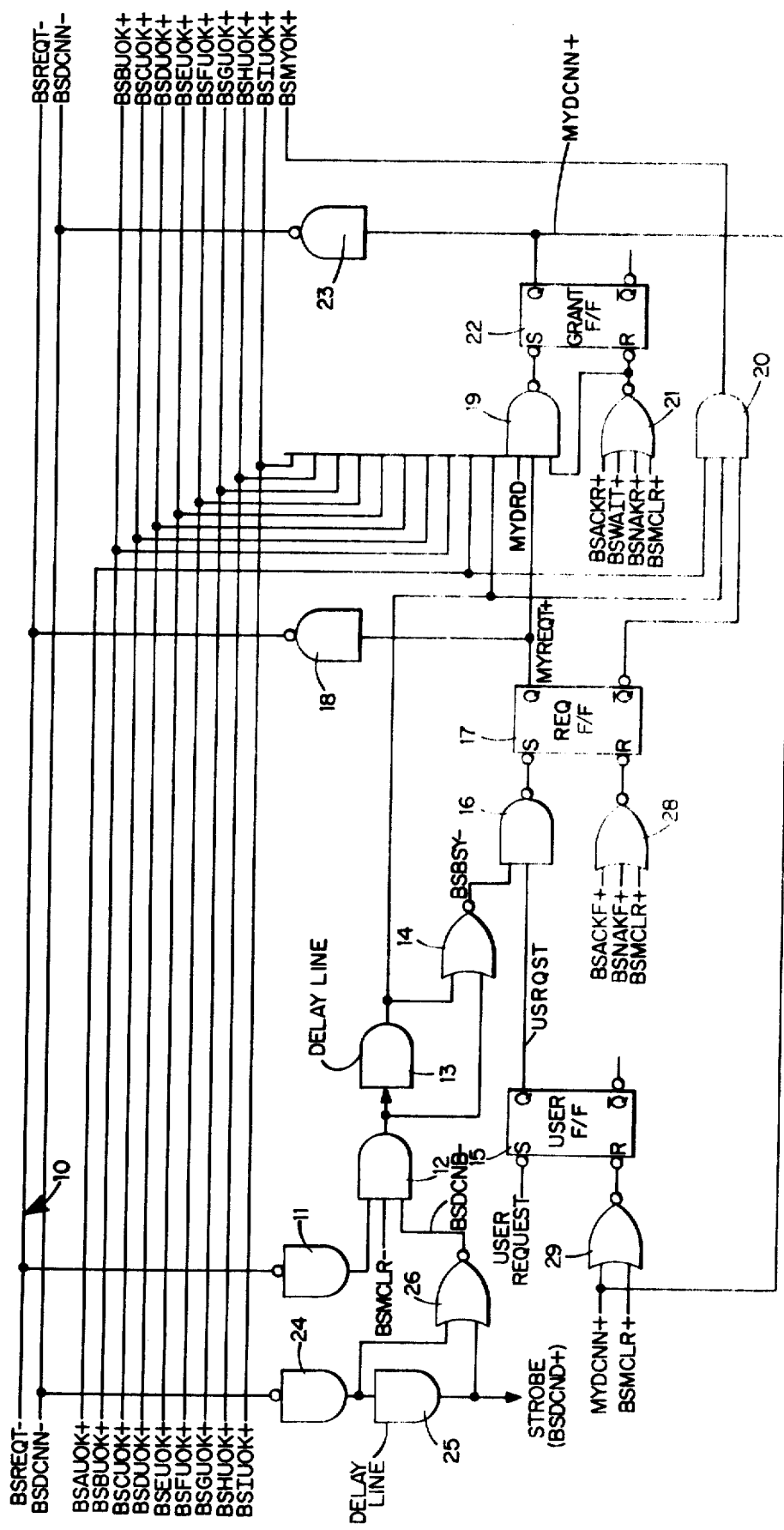
FIG. 8 illustrates a logic diagram of the priority network which may be used in combination with the present invention.

The distributed tie-breaking network provides the function of granting bus cycles and resolving simultaneous requests for use of the bus. Priority is granted on the basis of physical position on the bus, the highest priority being given to the first unit on the bus. The logic to accomplish the tie-breaking function is shown in FIG. 8 and is distributed identically among all units connected to the bus. In a typical system, the memory is granted the highest priority and the central processor is granted the lowest priority with the other units being positioned on the basis of their performance requirements.

Thus, referring to FIG. 1, a typical system of the present invention includes a multiline bus 200 coupled with memory 1-202 through memory N-204, such memories having the highest priority and with the central processor 206 having the lowest priority. Also connected on the bus may be included for example a scientific arithmetic unit 208 and various controllers 210, 212 and 214. Controller 210 may be coupled to control for example four unit record peripheral devices 216. Controller 212 may be used to provide communications control via modem devices whereas controller 214 may be utilized to control mass storage devices such as a tape peripheral device 218 or a disk peripheral device 220. As previously discussed, any one of the devices coupled with the bus 200 may address a memory or any other unit connected to the bus. Thus tape peripheral 218 may, via controller 214, address memory 202. As shall be hereinafter discussed, each of such units directly connected to the bus includes a tie-breaking logic as illustrated and discussed with respect to FIG. 8, and further each one of such units inclues address logic as discussed with reference to FIG. 9 for a typical basic device controller address logic, FIG. 10 for typical memory address logic, and FIG. 11 for typical central processor address logic. Units not directly connected to the bus, such as units 216, 218 and 220 also have tie-breaking logic.

A channel number will exist for every end point in a particular system with the exception of the memory type processing elements which are identified by the memory address. A channel number is assigned for each such device. Full duplex devices as well as half-duplex devices utilize two channel numbers. Output only or input only devices use only one channel number each. Channel numbers are easily variable and accordingly one or more hexidecimal rotary switches (thumb wheel switch) may be utilized for each such unit connected with the bus to indicate or set the unit's address. Thus when a system is configured, the channel number may be designated for the particular unit connected to the bus as may be appropriate for that particular system. Units with multiple input/output (I/O) ports generally will require a block of consecutive channel numbers. By way of example, a four port unit may use rotary switches to assign the upper seven bits of a channel number and may use the lower order three bits thereof to define the port number to distinguish input ports from output ports. The channel number of the slave unit will appear on the address bus for all non-memory transfers as shown in FIG. 3. Each unit compares that number with its own internally stored number (internally stored by means of the rotary switches). The unit which achieves a compare is, be definition, the slave, and must respond to that cycle. Generally, no two points in a signel system will be assigned to the same channel number. As shown in FIG. 3, a specific bus or I/O function can be performed as indicated by bits 18 through 23 of the bus address leads for non-memory transfers. Function codes may designate output or input operations. All odd function codes designate output transfers (write) while all even function codes designate input transfer requests (read). The central processor examines the least significant bit 23 of the six bit function code field for an input/output command and uses a bus lead to designate the direction.

Figure 5:
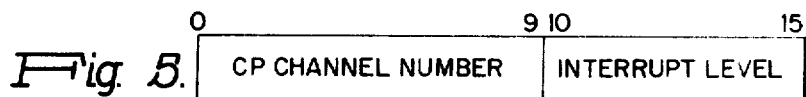

There are various output and input functions. One of the output functions is a command whereby a data quantity, for example 16 bits is loaded into the channel from the bus. The meanings of the individual data bits are component specific, but the data quantity is taken to mean the data to be stored, sent, transmitted, etc. depending upon the specific component functionality. Another such output function is a command whereby for example a 24 bit quantity is loaded into a channel address register (not shown). The address is a memory byte address and refers to the starting location in memory where the channel will commence input or output of data. Various other output functions include an output range command which defines the size of the memory buffer assigned to the channel for a specific transfer, an output control command which by its individual bits causes specific responses, output task functions such as print commands, output configuration which is a command to indicate functions such as terminal speed, card reader mode, etc., and output interrupt control which is a command which loads for example a 16-bit word into the channel with the format as shown in FIG. 5. The first 10 bits indicate the central processor channel number and bits 10 through 15 indicate the interrupt level. Upon interrupt, the central processor channel number is returned on the address bus while the interrupt level is returned on the data bus.

The input functions include functions similar to the output functions except in this case the input data is transferred from the device to the bus. Thus, the input functions include the input data, input address and input range commands as well as the task configuration and interrupt commands. In addition, there is included the device identification command whereby the channel places its device identification number on the bus. Also included are two input commands whereby a status word 1 or a status word 2 is placed on the bus from the channel as presently discussed.

The indication from status word 1 may include for example whether or not the specific device is operational, whether it is ready to accept information from the bus, whether there is an error status or whether attention is required. Status word 2 may include for example an indication of parity, whether there is a non-correctable memory or a corrected memory error, whether there is a legal command or for example whether there is a non-existent device or resource.

Figure 6:
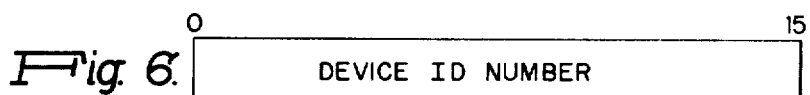

As previously discussed, a unique device identification number is assigned to every different type of device which is connected to the bus. This number is presented on the bus in response to the input function command entitled input device identification. This number is placed on the data bus in the format shown in FIG. 6. For convenience, the number is separated into 13 bits identifying the device (bits 0 through 12) and three bits identifying certain functionality of the device (bits 13 through 15) as may be required.

Figure 7:
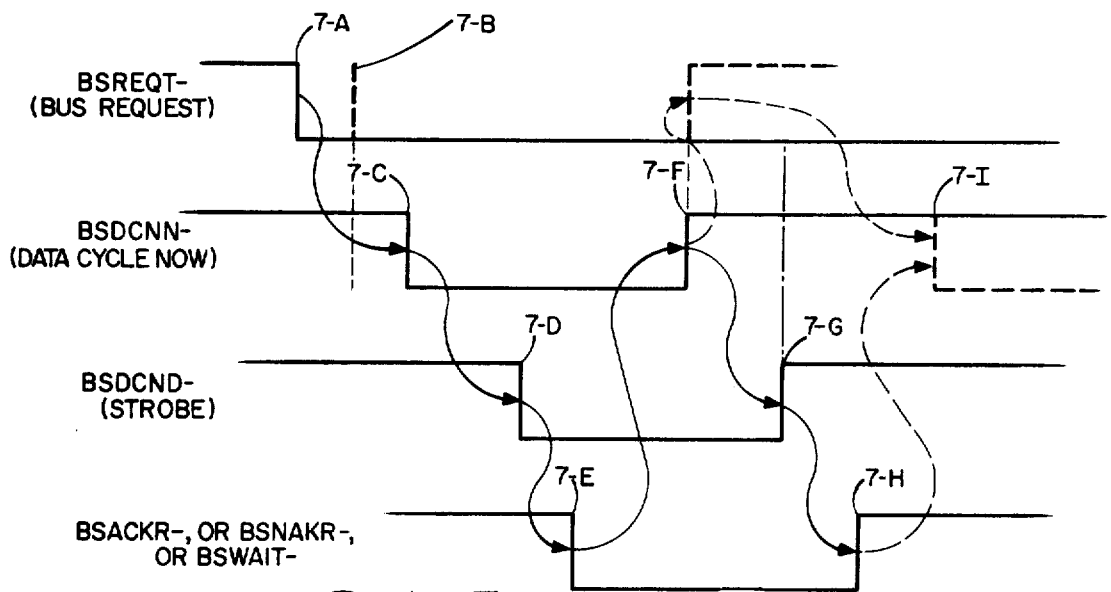
FIG. 7 illustrates a timing diagram of the operation of the bus of the representative system.

A unit wishing to interrupt the central processor requests a bus cycle. When the bus cycle is granted, the unit places its interrupt vector on the bus, the interrupt vector including the channel number of the central processor and the interrupt level number. The unit thus provides, as its interrupt vector, the master's channel number and its interrupt level number. If this is the central processor's channel number, the central processor will accept the interrupt if the level presented is numerically smaller than the current internal central processor level and if the central processor has not just accepted another interrupt. Acceptance is indicated by a bus ACK signal (BSACKR—). If the central processor cannot accept the interrupt, a NAK signal is returned (BSNAKR—). Devices receiving a NAK (sometimes referred to as NACK) signal will retry when a signal indicating resume normal interrupting is received from the CP (BSRINT—). The central processor issues this signal when it has completed a level change and therefore may be capable of accepting interrupts once again. The channel number of the master is supplied in the vector for use since more than one channel may be at the same interrupt level. Interrupt level 0 is of special significance since it is defined to mean that the unit shall not interrupt. FIG. 7 illustrates the bus timing diagram and will be discussed more specifically hereinafter. Generally, however the timing is as follows. The timing applies to all transfers from a master unit to a slave unit connected to the bus. The speed at which the transfer can occur is dependent upon the configuration of the system. That is, the more units connected to the bus and the longer the bus, then, due to propagation delays, the longer it takes to communicate on the bus. On the other hand, the lesser amount of units on the bus decreases the response time. Accordingly, the bus timing is truly asynchronous in nature. A master which wishes a bus cycle makes a bus request. The signal BSREQT— is common to all units on the bus and if a binary ZERO, indicates that at least one unit is requesting a bus cycle. When the bus cycle is granted, the signal BSDCNN— becomes a binary ZERO indicating that a tie-breaking function as more specifically discussed with respect to FIG. 8, is complete and that one specific master now has control of the bus. At the time the signal BSDCNN— becomes a binary ZERO, the master applies the information to be transferred to the bus. Each unit on the bus develops an internal strobe from the signal BSDCNN—. The strobe is delayed for example approximately 60 nanoseconds from the reception of the binary ZERO state of the BSDCNN— signal. When the delay is complete in the slave, the bus propagation time variation will have been accounted for and each slave unit would have been able to recognize its address (memory address or channel number). The addressed slave can now make one of three responses, either an ACK, a NACK or a WAIT signal, or more specifically a BSACKR—, a BSNAKR—, or a BSWAIT— signal. The response is sent out on the bus and serves as a signal to the master that the slave has recognized the requested action. The control lines then return to the binary ONE state in the sequence as shown in FIG. 7. Thus the bus handshake is fully asynchronous and each transition will only occur when the preceding transistion has been received. Individual units may therefore take different lengths of time between the strobe and the ACK, etc., transition depending on their internal functionality. A bus timeout function exists to prevent hang ups which could occur.

Information which is transferred over the bus can include for example 50 signals or bits, which may be broken down as follows: 24 address bits, 16 data bits, 5 control bits, and 5integrity bits. These various signals will be discussed hereinafter.

The tie-breaking function, more specifically described with respect to FIG. 8, is that of resolving simultaneous requests from different units for service and granting bus cycles on a basis of a positional priority system. As indicated hereinbefore, the memory has the highest priority and the central processor has the lowest priority and they reside physically at opposite ends of the bus 200. Other units occupy intermediate positions and have priority which increases relative to their proximity to the memory end of the bus. The priority logic of FIG. 8 is included in each one of the units directly connected to the bus in order to accomplish the tie-breaking function. Each such unit's priority network includes a grant flip-flop. At any point in time, only one specific grant flip-flop may be set and that unit is by difinition the master for that specific bus cycle. Any unit may make a user request at any time thus setting its user flip-flcp. At any time therefore, many user flip-flops may be set, each representing a future bus cycle. In addition, each unit on the bus contains a request flip-flop. When all units are considered together, the request flip-flops may be considered as a request register. It is the outputs of this register that the supply the tie-breaking network which functions to set only one grant flip-flop no matter how many requests are pending. More specifically, if there were no pending requests, then no request flip-flops would be set. The first user flip-flop to set would cause its request flip-flop to set. This in turn would inhibit, after a short delay as hereinafter described, other devices from setting their request flip-flops. Thus what occurs is that a snap-shot of all user requests is taken for the given period in time (the delay's period). The result is that a number of request flip-flops may be set during this delay period depending upon their arrival. In order to allow the request flip-flops to have their outputs become stable, each unit includes such delay in order to insure that such stabilization has occurred. A particular grant flip-flop is set if the unit associated therewith has its request flip-flop set and the delay time has elapsed and no higher priority unit wants the bus cycle. A strobe signal is then generated after another delay period and finally the grant flip-flop is cleared (reset) when the master receives an ACK, NACK or WAIT signal from the slave unit.

As indicated hereinbefore, there are three possible slave responses, the ACK, the WAIT or the NACK signal. In addition, there is a fourth state in which there is no response at all. In the case where no unit on the bus recognizes the transfer as addressed to it, no response will be forthcoming. A time out function will then take place and a NACK signal will be received thereby clearing the bus. An ACK signal will be generated if the slave is capable of accepting the bus transfer from the master and wishes to do so. The WAIT response is generated by the slave if the slave is temporarily busy and cannot accept a transfer at this time. Upon receipt of the WAIT signal, the master will retry the cycle at the next bus cycle granted to it and continue to do so until successful. Some of the causes of a WAIT response from a slave, when the central processor is the master, are for example, when the memory is a slave and the memory is responding to a request from another unit or when a controller is a slave, for example, if the controller is waiting for a response from memory of if the controller has not yet processed the previous input/output command. When a controller is the master and the central processor is the slave, the central processor may respond with an ACK or a NACK signal to the controller, but not a WAIT signal. In addition, the memory when it is the master cannot be caused to wait whether the slave unit is a central processor or a controller. The NACK signal indicated by the slave means that it cannot accept a transfer at this time. Upon receipt of a NACK signal, a master unit will not immediately retry but will take specific action depending upon the type of master.

As generally indicated hereinbefore, there are basic timing signals on the bus which accomplish the handshaking function thereof. These five signals, as discussed hereinbefore, are bus request signal (BSREQT−) which when a binary ZERO indicates that one or more units on the bus have requested the bus cycle; the data cycle now signal (BSDCNN−) which when a binary ZERO indicates a specific master is making a bus transfer and has placed information on the bus for use by some specific slave; the ACK signal (BSACKR−) which is a signal generated by the slave to the master that the slave is accepting this transfer by making this signal a binary ZERO; the NAK signal (BSNAKR−) which is a signal generated by the slave to the master indicating to the master when it is a binary ZERO that it is refusing this transfer; and the WAIT signal (BSWAIT−) which is a signal generated by the slave to the master indicating when it is a binary ZERO that the slave is refusing the transfer.

In addition and as indicated hereinbefore, there may be as much as fifty information signals which are transferred as the information content of each bus cycle. These signals are valid for use by the slave on the leading edge of the strobe signal. All of the following discussion is by way of example and it should be understood that the number of bits may be changed for different functions. Thus, there may be 16 leads or bits provided for the data and more particularly signals BSDT00− through BSDT15−. There are 24 leads provided for the address, more particularly signals BSAD00− through BSAD23−. There is one bit provided for the memory reference signal (BSMREF−) which when a binary ZERO indicates that the address leads contain a memory address. When the memory reference signal is a binary ONE it indicates that the address leads contain a channel address and a function code as indicated in FIG. 3. There is also provided a byte signal (BSYTE−) which indicates when it is a binary ZERO that the current transfer is a byte transfer rather than a word transfer, a word typically comprising two bytes. There is also a write signal (BSWRIT−) which indicates when it is a binary ONE that the slave is being requested to supply information to the master. A separate bus transfer will provide this information. There is further provided a second-half bus cycle (BSSHBC−) which is used by the master to indicate to the slave that this is the information previously requested. From the time a pair of units on the bus have started a read operation (indicated by the signal (BSWRIT−) until the second cycle occurs, to complete the transfer (indicated by BSSHBC−) both units may be busy to all other units on the bus.

In addition to miscellaneous error and parity signals, there is also included a lock signal among the fifty information signals on the bus. The lock signal (BSLOCK−)

is used to cause a lock operation to occur. This is a multi-cycle bus transfer whereby a unit may read or write a word or multi-word area of memory without any other unit being able to break into the operation with another lock command. This facilitates the connection of the system into a multiprocessing system. The effect of the lock operation is to extend a busy condition beyond the duration of the memory cycle for certain types of operations. Other units attempting to initiate lock signals before the last cycle is complete will receive a NACK response. The memory will however still respond to other memory requests. An example of the lock operation is the read modify write cycle, the three bus cycles of which are as follows. During the first bus cycle, the address bus contains the memory address, the data bus contains the channel number of originator, the signal BSWRIT— is a binary ZERO indicating a response is required, the signal BSLOCK— is a binary ZERO indicating that this is a locked operation and further the BSMREF— signal is a binary ZERO, and the signal BSSHBC— is a binary ONE. During the second bus cycle of the read modify write operation, the address bus contains the channel number of the originator, the data bus contains the memory data, the BSSHBC— signal is a binary ZERO denoting a read response and the BSMREF— signal is a binary ONE. During the third bus cycle, the address bus contains the memory address, the data bus contains the memory data, the BSLOCK— signal is a binary ZERO indicating the completion of the read modify write operation and the BSMREF— signal is a binary ZERO, and the BSSHBC— signal is a binary ZERO. In addition the BSWRIT— signal is a binary ONE. As in all other operations, the intervening time on the bus between the three bus cycles of the read modify write operation may be used by other units not involved in the transfer.

In addition to the other control signals, also provided on the bus may be the bus clear (BSMCLR—) signal which is normally a binary ONE and which becomes a binary ZERO when the master clear button, which may be located on the central processor's maintenance panel, is actuated. The bus clear signal may also become a binary ZERO during a power up sequence for example. The resume interrupting signal (BSRINT—) is a pulse of short duration which is issued by the central processor whenever it completes a level change. When this signal is received, each slave unit which had previously interrupted and had been refused, will reissue the interrupt.

The timing diagram of FIG. 7 will now be more specifically discussed in detail with respect to the address logic circuitry of a typical controller, the memory and the central processing unit.

With reference to the timing diagram of FIG. 7, in every bus cycle there are three identifiable parts, more particularly, the period (7-A to 7-C) during which the highest priority requesting device wins the bus, the period (7-C to 7-E) during which the master unit calls a slave unit, and the period (7-E to 7-G) during which the slave responds. When the bus is idle the bus request signal (BSREQT—) is a binary ONE. The bus request signal's negative going edge at time 7-A starts a priority net cycle. There is an asynchronous delay allowed within the system for the priority net to settle (at time 7-B) and a master user of the bus to be selected. The next signal on the bus is the BSDCNN— or data cycle now signal. the BSDCNN— signal's transition to a binary ZERO at time 7-C means that use of the bus has been granted to a master unit. Thereafter, the second phase of bus operation means the master has been selected and is now free to transfer information on the data, address and control leads of the bus 200 to a slave unit that the master so designates.

The slave unit prepares to initiate the third phase of bus operation beginning at the negative going edge of the strobe or BSDCND— signal. The strobe signal is delayed, for example, 60 nanoseconds from the negative going edge of BSDCNN— signal by delay line 25 of FIG. 8. Upon the occurrence of the negative going edge of the BSDCND— signal at time 7-D, the slave unit can now test to see if this is his address and if he is being called to start the decision making process of what response it is to generate. Typically, this will cause an acknowledge signal (BSACKR—) to be generated by the slave unit or in the non-typical cases a BSNAKR— or BSWAIT— signal or even no response at all (for the case of a non-existant slave) may be generated as herein described. The negative going edge of the acknowledge signal at time 7-E when received by the master unit, causes the master's BSDCNN— signal to go to a binary ONE at time 7-F. The strobe signal returns to the binary ONE state at time 7-G, which is a delay provided by delay line 25 from time 7-F. Thus, in the third phase of bus operation, the data and address on the bus are stored by the slave unit and the bus cycle will begin to turn off. The ending of the cycle, i.e., when BSDCNN— goes to a binary ONE, dynamically enables another priority net resolution. A bus request signal may, at this time, be generated and if not received, this means that the bus will return to the idle state, and accordingly the BSREQT— signal would to to the binary ONE state. If the bus request signal is present at that time, i.e., a binary ZERO as shown, it will start the asynchronous priority net selection process following which another negative going edge of the BSDCNN— signal will be enabled as shown by the dotted lines at time 7-I. It should be noted that this priority net resolution need not wait or be triggered by the positive going edge of the acknowledge signal at time 7-H, but may in fact be triggered at a time 7-F just following the transition of the bus to an idle state if thereafter a unit desires a bus cycle. This process repeats in an asynchronous manner.

Now referring to the priority net logic of FIG. 8, the priority net cycle is initially in an idle state and the bus request signal (BSREQT—) on line 10 is a binary ONE. When this bus request signal is a binary ONE, the output of receiver (inverting amplifier) 11 will be a binary ZERO. The output of receiver 11 is coupled to one input of gate 12. The other inputs to gate 12 are the bus clear signal which is normally a binary ONE and the output of gate 26 which is normally a binary ONE also. The output of gate 12, during the bus idle state is thus a binary ZERO, and thus the output of the delay line 13 will be a binary ZERO. The input and the output of the delay line 13 being a binary ZERO allows the output of NOR gate 14 (BSBSY—) to be a binary ONE. When one of the units connected to the bus desires a bus cycle, it asynchronously sets its user flip-flop 15 so that its 0 output is a binary ONE.

Thus, with the bus in the idle state, the first event that occurs as the bus goes to the busy state is that the user sets its user request flip-flop 15 thereby generating the active state of the USRQST signal. When both inputs to gate 16 are a binary ONE state, the output thereof is a binary ZERO. This sets the request flip-flop 17 so that its Q output (MYREQT+) is a binary ONE. Thus, in an asynchronous manner, the Q output of request flip-flop 17 will be a binary ONE. This operation can be coincidentally occurring in the silimar logic of the other units connected with the bus.

The binary ONE state of the MYREQT+ signal will be placed on line 10 of the bus via driver 18 as a binary ZERO. Thus referring to the timing diagram of FIG. 7, the BSREQT− signal goes negative or to a binary ZERO state. Any request to the system from any one of the request flip-flops 17 of the various units connected to the bus will thus hold line 10 in the binary ZERO state. The delay line 13 includes sufficient delay to compensate for the propagation delay encountered by elements 14, 16, and 17. Thus, even though a device sets its request flip-flop 17, this does not mean that a higher priority device, which also requests a bus cycle, will not take the next bus cycle. For example, if a lower priority device sets its request flip-flop 17, the binary ZERO signal on line 10 is fed back to all devices, including the higher priority device, which in turn generates a binary ONE state at the output of its gate 12 so as to generate a binary ZERO state at the output of gate 14, thereby disabling the setting of the request flip-flop 17 of such other higher priority device, if in fact the user flip-flop 15 of such higher priority device had not already been set. Once the delay time of, for example 20 nanoseconds has expired and the output of line 13 of such higher priority device is now a binary ONE state, then the output of gate 14 will be a binary ZERO state so that independent of whether or not the user flip-flop 15 of such higher priority device has been set, the output of gate 16 will be a binary ONE thereby disabling the setting of request flip-flop 17. Thus during such time frame, all devices have their request flip-flop 17 set if in fact they are requesting service as indicated by the setting of their user flip-flop 15. After the delay time provided by element 13 of the device first requesting a bus cycle, a device not having had its request flip-flop 17 set cannot do so until after the bus cycle is completed. Thus the higher priority device will win the bus even if its user flip-flop is set a few nanoseconds after the lower priority device sets its flip-flop.

Thus all of the request flip-flops 17 for devices seeking a bus cycle will have been set during such interval as indicated by the delay line arrangement of delay line 13. Notwithstanding that many of such devices coupled with the bus may have their request flip-flops set during such time interval, only one such device may have its grant flip-flop 22 set. The device that has its grant flip-flop 22 set will be the highest priority device seeking the bus cycle. When such highest priority device seeking a bus cycle has completed its operation during such bus cycle, the other devices which have their request flip-flops set, will again seek the next such bus cycle and so on. Thus the Q output of request flip-flop 17 in addition to being fed to driver 18 is also coupled to one input of NAND gate 19. The $\overline{Q}$ output of flip-flop 17 is coupled to one input of AND gate 20. Except for the units my data ready signal (MYDRD), the other inputs to gate 19 are received from the higher priority devices and more particularly, for example, nine preceding higher priority devices. These signals received from the higher priority devices are shown to be received from the left-hand side of FIG. 8 as signals BSAUOK+ through BSIUOK+. If any one of such nine signals is a binary ZERO, this will mean that a higher priority device has requested a bus cycle and accordingly this will inhibit the current device from having its grant flip-flop 22 set and thereby disable it from having the next bus cycle. Flip-flop 22 will also not be set if the MYDRD signal is not generated by the unit.

The other inputs received by gate 19 are from the delay line 13 output and the output of NOR gate 21. The output of delay line 13 is a binary ONE and if all other inputs to gate 19 are a binary ONE, then grant flip-flop 22 will be set. The other input from gate 21 is a binary ONE when the bus is in an idle state. The inputs to NOR gate 21 are the BSACKR+ signal, the BSWAIT+ signal, the BSNARK+ signal and the BSMCLR+ signal. If any one of these signals is a binary ONE, then the bus will accordingly be in a busy state and the flip-flop 22 cannot be set.

If grant flip-flop 22 has been set, the Q output signal is a binary ONE and will be inverted to a binary ZERO signal by inverter 23 and will then be placed on the bus on signal line BSDCNN−. This is shown in the timing diagram of FIG. 7, when the BSDCNN− signal goes from the binary ONE to the binary ZERO state. Thus, the priority cycle of the bus cycle is completed.

In addition, if the present device does require service and is the highest priority device, the two inputs received by gate 19 from delay line 13 and the BSAUOK+ priority line will be a binary ONE, however, the $\overline{Q}$ output of flip-flop 17 will be binary ZERO thereby placing the binary ZERO on the BSMYOK+ signal thereby indicating to the next lower priority device and succeeding lower priority devices that there is a requesting higher priority device which will be using the next bus cycle, thereby inhibiting all lower priority devices from so using the next bus cycle. It should be noted that the nine priority lines received from the higher priority devices are transferred in a skewed manner by one position as signals BSBUOK+ through BSMYOK+. Thus, signal BSAUOK+ received by the present device corresponds to signal BSBUOK+ received at the next lower priority device.

Having completed a priority cycle and having now caused a binary ZERO state to be placed on the BSDCNN− line, the signal is received by all such logic as shown in FIG. 8 by receiver 24. This causes the binary ONE state to be generated at the output of receiver 24 and a binary ZERO to be provided at the output of NOR gate 26 thereby disabling AND gate 12 from generating a binary ONE state. In addition, the binary ONE state at the output of receiver 24 is received by delay line 25 which is by way of example 60 nanoseconds in duration. The output of delay line 25 is also received at the other input of NOR gate 26 so as to continue to inhibit gate 12 when the strobe is generated. Thus at the end of the delay line period established by delay line 25, the strobe (BSDCND+) signal is generated, the inversion of which, i.e., the BSDCND− signal is shown in the timing diagram of FIG. 7. The use of the strobe signal is hereinafter described. Thus the 60 nanosecond period produced by delay line 25 inhibits the priority network of FIG. 8 from functioning thereby enabling the winning device, i.e., the highest priority requesting device to utilize the next bus cycle without interference. The strobe generated at the output of delay line 25 is used by a potential slave as a synchronizing signal.

If the strobe signal has been transmitted, then the one of the units which is designated as the slave, will respond with either one of the signals ACK, WAIT or NACK received at one of the inputs of gate 21. If in the typical case, the ACK is received, for example, or if any of such response signals are received, this will reset the grant flip-flop 22. This response is shown in the timing diagram of FIG. 7 wherein the BSACKR— signal is shown to be received from the slave thereby causing the BSDCNN— signal to change to the binary ONE state by the resetting of grant flip-flop 22. The logical equivalent of the BSACKR+ signal as well as the other two signals is received by gate 28 as the BSACKF+ signal. The only difference between such signals is a few nanoseconds of delay. This causes the flip-flops 17 to reset. The BSACKF+ signal and the other two signals will only be received by the winning unit and only its request flip-flop 17 and its user flip-flop 15 are reset. Flip-flop 15 will be reset via NOR gate 29 if the grant flip-flop 22 has been set, or if the bus clear signal, as is the case for the other two flip-flops 17 and 22 is received on the bus. Thus, this process continues for each of the respective units in an asynchronous manner so as to enable one of such units connected to the bus to utilize the next bus cycle.

Figure 9:
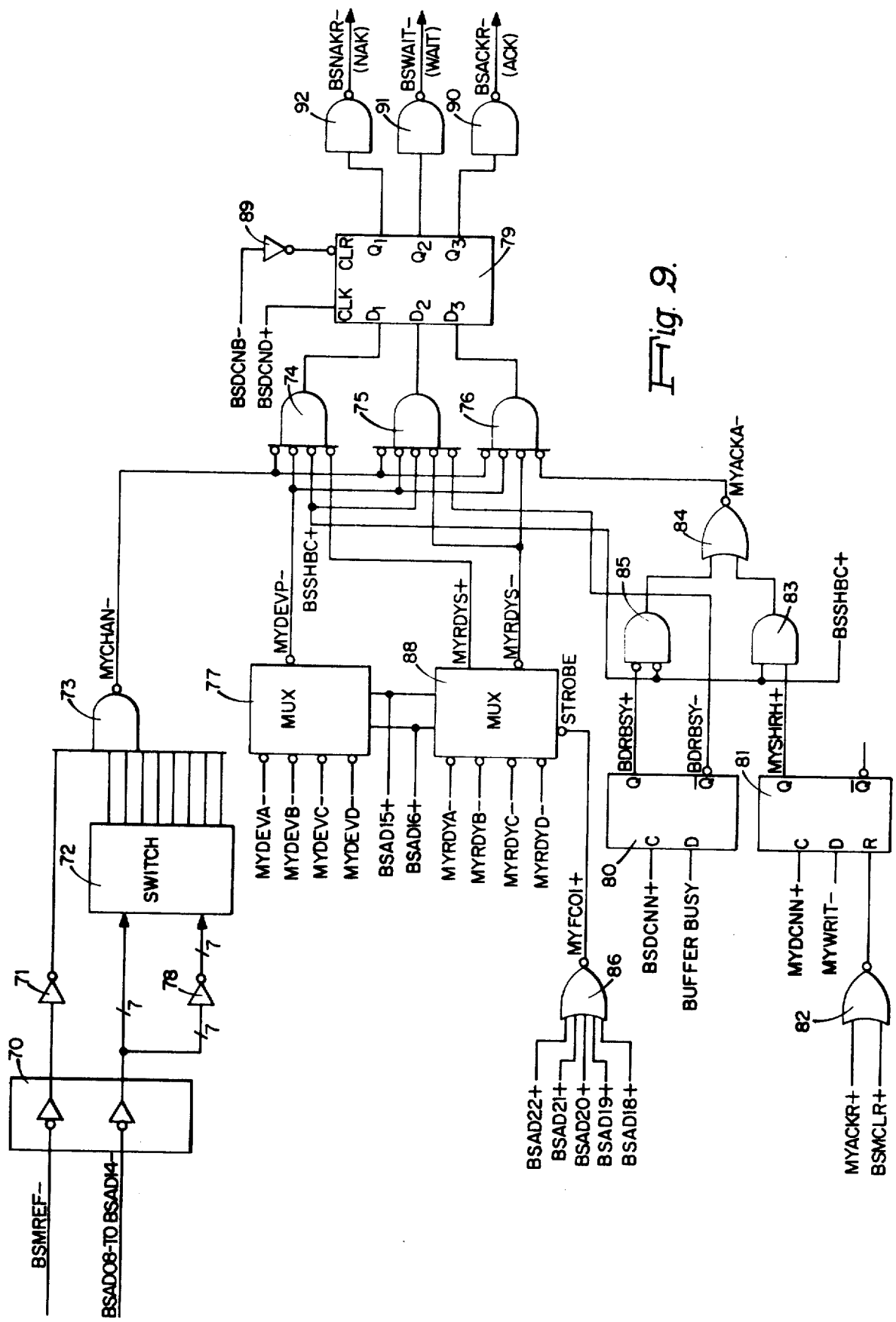
FIG. 9 illustrates bus interface logic of a typical device controller coupled with the bus of the system of the present invention.

Now with reference to typical controller address logic as shown in FIG. 9, this logic is exemplary of controllers particularly one having up to four subunits or peripheral devices connected thereto. Element 70 includes line receivers, one for the memory reference signal (BSMREF—), and the others, one each, for the bus address BSAD08— to BSAD14—. Because this logic in FIG. 9 is for a non-memory controller, the memory reference signal is a binary ONE, both at the input of element 70 and the output of inverter 71.

A switch 72 is coupled to receive the seven address leads as well as the inversion thereof via inverters 78. This switch is located in most device controllers connected to the bus 200 and is set to the address of the particular unit. With fourteen leads received at the switch, only seven are coupled at the output thereof to multiple input NAND gate 73. The bus address leads at the inner side of element 70 are a binary ZERO for those bits which reflect the proper address of the desired unit. Accordingly with the inversion provided by element 70, binary ONE signals are provided at the non-inverted inputs of switch 72 for those bits of the address which were received on bus 200 as binary ZEROS. Similarly, the seven output leads from the inverters 78 have binary ONES for those positions in which the address bits are binary ONES on the incoming address bits on bus 200. With the signals at the two inputs of switch 72 the complements of each other, the switches therein, which may be a hexadecimal switch or a plurality of toggle switches, more particularly a nonganged seven pole, two position switch, are set so that for the correct device address, all binary ONE signals appear at the seven outputs of switch 72. Thus, gate 73 will receive all binary ONE signals and will provide a binary ZERO at its output if this is the proper device address and if this is not a memory cycle as shall be explained. It can be seen that the switch 72 is arranged so as to provide a comparator function and eliminates the need for at least one level of gating and accordingly the associated propagation delay therefor. Further, the switch provides an easy means for changing the address of a particular unit thereby simplifying the manner in which a system may be configured.

The output of gate 73 is referred to as the MYCHAN— signal and will be a binary ZERO for the selected slave. The MYCHAN— signal is coupled to one input of each of the three NOR gates 74, 75 and 76 and, as shall be seen, is utilized to generate the ACK, WAIT, or NAK signal. The other inputs to gates 74, 75 and 76 are received as follows.

Multiplexer 77 is coupled to receive four signals from respectively up to four subunits or peripheral devices connected with the particular controller logic as shown in FIG. 9. These signals received at the inputs of multiplexer 77 indicate respectively whether or not the particular subunit is present, i.e., installed in the system. That is, one or more of such subunits may be connected. If only one is so connected, then only one of such signals will indicate the presence of a subunit. These signals indicating that the subunits are present are indicated as the MYDEVA—, MYDEVB—, MYDEVC—, and the MYDEVD— signals. Multiplexer 77 as well as multiplexer 88 to be hereinafter discussed may be that device manufactured by Texas Instruments having part number 74S151. The binary ZERO state of such signals indicates that the subunit is present in the system. The multiplexer 77 is enabled by the address signals BSAD15+ and BSAD16+ received from the bus 200 via inverting amplifiers or receivers not shown. The same two address signals are coupled to enable multiplexer 88. These two bits indicate which one of the, by way of illustration, up to four subunits or devices is being addressed. The output of multiplexer 77 is the MYDEVP— signal which, when a binary ZERO, indicates that the device addressed is present. Thus each of the gates 74, 75 and 76 receives the output from multiplexer 77 and accordingly a response from a particular controller is governed by the presence of the controller's channel number and the fact that the controller actually has the subunit attached and present in the system. This arrangement allows continuity in addresses between one subunit to the next. In general, with more than one basic device controller 210 as shown in FIG. 1 in the system, and with each such controller 210 coupled to control different types of peripheral devices, or with all such controllers 210 coupled to control the same type of peripherals 216, by selectively arranging such peripherals 216 with the controller 210, the addresses for each such subunit or peripheral may be contiguous. Further such addresses may be configured so that no matter how large or small the system, a particular address may have any type of peripheral device associated therewith.

The other multiplexer 88 is coupled to receive indications from any one of the four subunits for example to indicate that in fact such subunit is ready to receive or send data. Thus, the ready signals received by multiplexer 88 are different from the presence signals received by multiplexer 77. Whereas the presence signals indicate whether or not the particular subunit or peripheral device is installed and present in the system, the ready signal indicates dynamically whether the associated subunit is ready and capable of sending data or receiving data. These ready signals are referred to as MYRDYA—, MTRDYB—, MYRDYC—, and MYRDYD—. Receipt of the MYFCO1+ signal to the strobe input of multiplexer 88 is an exception to the normal operation of multiplexer 88 and will be discussed hereinafter.

The output of multiplexer 88 labelled MYRDYS—, when a logical ZERO, enables the generation of either a WAIT signal or the ACK signal depending upon the state of the other signals received at the gates 74, 75 and 76. If a binary ZERO is generated at the MYRDYS+ output of multiplexer 88, a NAK signal will be generated thus indicating that the addressed subunit is not in fact ready.

Gates 75 and 76 receive other signals, gate 75 receiving the BDRBSY— signal as shall be explained hereinafter and gate 76 receiving the MYACKA— signal from the output of gate 84. These two signals are explained with reference to the functions provided by flip-flops 80 and 81. In each controller, there is a buffer or register which accepts the data from the bus 200. If this data buffer is busy, that is, it already has information stored therein which cannot be lost, then there will be an indication that the buffer is busy and this will be received at the D input of D-type flip-flop 80, whose D input will be reflected at the Q output thereof upon receipt of the clock signal which in this case is the BSDCNN+ signal received via a driver from the bus. Thus, at the time the data cycle now signal, i.e. the BSDCNN— signal, goes to the binary ZERO state as shown in FIG. 7, if the buffer associated with this particular controller is in fact busy, then the Q output of flip-flop 80, i.e., the BDRBSY+ signal will be a binary ONE which via NAND gate 85 will be a binary ZERO. This binary ZERO state coupled to the input of NOR gate 84 will generate a binary ONE at its output, which will then inhibit gate 76 from generating an ACK signal. However, the Q̄ output of flip-flop 80, i.e., the BDRBSY— signal will be a binary ZERO which will be provided at one input of gate 75, which if all the inputs are binary ZEROS will generate of WAIT signal. Thus, if the buffer is not busy and other conditions exist, an ACK signal will be generated. If the buffer is busy, then either a WAIT signal or a NAK signal, depending upon the other conditions, will be generated.

The flip-flop 81 is used to indicate whether or not this is a second half read cycle operation. As discussed hereinbefore, the BSSHBC— signal is used by the master to indicate to the slave that this is the information previously requested. From the time a pair of devices coupled with the bus has started a read operation (indicated by BSWRIT—) until the second cycle occurs to complete the transfer, (indicated by BSSHBC—), both devices may be busy to all other devices on the bus. Thus, looking at the inputs of flip-flop 81, the MYDCNN+ signal clocks the flip-flop, such signal coupled to and being the logical equivalent to the Q output of the grant flip-flop 22 of the device which has become the master. Received at the D input of flip-flop 81, is the MYWRIT— signal which means that this was the particular device which started the memory read cycle and that such device is now waiting to read from the memory and that such particular device is expecting a second half read cycle to be later generated by the memory as the memory completes the cycle.

The second half read cycle history flip-flop 81 has as its reset inputs, the MYACKR+ and the BSMCLR+ signals, both coupled to the reset input via NOR gate 82. The BSMCLR+ signal acts to reset flip-flop 81 as discussed hereinbefore for various other flip-flops and the MYACKR+ signal indicates that the second half read cycle is complete. Thus if the flip-flop 81 is set, this set condition is coupled from the Q output of flip-flop 81 to partially enable one input of AND gate 83. In order to fully enable AND gate 83, the BSSHBC+ signal must be generated by the memory, indicating that this is the information previously requested. Thus, with the data coming from memory via the bus, this signal is activated and via NOR gate 84, the negative going edge of the MYACKA— signal is generated which permits the particular device to acknowledge this bus cycle by the enabling of gate 76 and via element 79, generating the ACK signal via driver 90. In addition and as indicated hereinbefore, an ACK acknowledgement may also be generated if in fact this is not a second half bus cycle and the buffer is not busy. This indication is provided by gate 85 through gate 84 in order to generate the ACK signal.

Thus, if the particular controller is waiting for a bus cycle, having had its second half read history flip-flop 81 set, then only the receipt of a second half bus cycle signal (BSSHBC+) can be responded to for this particular device. If this particular device is not waiting for a second half bus cycle then if the buffer is not busy, i.e., if there is no longer any useful information in such buffer, then an ACK signal may be generated.

In addition, the second half bus cycle signal (BSSHBC+) is received at one input of gate 74 as well as gate 75. When the second half read cycle flip-flop 81 has been set, the only output that can be obtained if this is the correct channel number, etc. as indicated by the inputs at gate 76, is an ACK signal. This is independent of whether or not the buffer is busy as indicated by flip-flop 80. Thus a NACK signal or a WAIT signal will be generated by gates 74 and 75 only if this is not a second half bus cycle signal, i.e. that the signal BSSHBC+ is a binary ZERO. In further explanation, a second half bus cycle received by the controller can come only, from the controller's point of view, from a memory and when the memory is ready to return the data to the controller, neither a NAK nor a WAIT signal can be generated, but rather only an acknowledge signal can be generated. Thus if the BSSHBC+ signal is a binary ONE, then neither the NAK nor the WAIT signals can be generated.

As indicated hereinbefore, when information is being transferred from the memory, the memory can never receive a NAK or WAIT signal. This is because of the inherent priority arrangement of the apparatus of the present invention. The memory is the highest priority device. If a unit has asked memory to send it information, then the unit can expect the information at some point in time. If the unit generates a WAIT or NAK signal to the memory, then because the memory is the highest priority device, the memory could keep trying to gain access to the particular controller which requested the data transfer and could hand up the bus, i.e. it could because the memory is the highest priority device, cause the bus to effectively disable further data transfers until the data is accepted by the particular controller which had previously asked for it. Thus only an acknowledge signal can be made in response to a request from memory to accept data. A controller however is allowed to generate a NAK or WAIT signal to another controller or a central processor. In addition, a general rule is that if one controller requests information from a controller of higher priority, the requesting controller must be ready to accept the information, and accordingly must respond with an ACK signal.

With respect to the ready multiplexer 88, as indicated hereinbefore, if the device is not ready, then the NAK signal, other conditions being met, will be generated. The reason the NAK signal is generated rather than the WAIT signal is because of the fact that typically, if a controller such as controller 210, is busy, the terminal will be busy more than just a few microseconds, but rather will be busy for milliseconds. Thus, cycle time would be wasted if the indication to the master is that the master keep trying. Rather the indication should be that the requesting unit go on with data processing rather than unnecessarily using bus cycles thereby delaying the overall response of the system. All the requesting unit has to do is at its convenience retry the destination unit.

As indicated hereinbefore, the strobe input of multiplexer 88 receives a signal from gate 86 identified as the MYFCOL+ signal. This signal is a combination of the function code of the signals received at the input of NOR gate 86, such function format code shown specifically in FIG. 3, and identified as bits BBSAD18+ through BSAD22+ with bit BSAD23+ not used. Within these bits, the function code is indicated so that the various units connected to the bus may recognize certain codes and commands, as hereinbefore discussed. A function code of all binary ZEROS indicates to the controller that this is a privileged function code and that unconditionally, the operation presently being undertaken by the controller must be stopped and the controller initialized. In a sense, this is an emergency function code and because of this, the controller must take action regardless of the ready state of the controller. In such event, the multiplexer 88 will generate a binary ONE on the MYRDYS+ output lead thereof thereby enabling either an ACK or a WAIT signal, but never a NAK signal, to be generated depending upon the state of the BDRBSY− signal which indicates whether the buffer is busy. If the buffer is busy, then a WAIT signal is generated, and if not, the ACK signal will be generated. By way of example, the central processor may generate this all binary ZEROS or emergency code in the function field if for example two seconds have elapsed and no response has been received from the device addressed. It should be understood however that the particular device addressed is the only one affected and the other three devices may in fact still be operating and accordingly this is not a clearing of the whole system connected to the particular controller. Thus, the only reason why the response to the emergency function code is dependent upon whether or not the buffer is busy is to insure that any one of the other three device connected to this particular controller and which has information in such commonly shared buffer, has ample opportunity to save that information.

In summary, the NAK signal (BSNAKR−) is generated via driver 92 from the respective D-type flip-flop of element 79, by the full enabling of gate 74, and when BSDCND+ signal clocks such flip-flop. Gate 74 is fully enabled when the channel number is received, the device address provides an indication that it is in fact installed, that such device is not ready and that this is not a second half bus cycle. The WAIT signal (BSWAIT−) is provided on the bus via driver 91 from its D-type flip-flop included in element 79 when gate 75 is fully enabled. Gate 75 is fully enabled when the channel number is received, the device address provides an indication that it is in fact installed and that it is in fact ready, that there is an indication that this is not a second half bus cycle and that the buffer is busy. The acknowledge (BSACKR−) signal is provided on the bus by means of driver 90 in response to the D-type flip-flop included in element 79 when gate 76 is fully enabled. Gate 76 is fully enabled when the correct channel number is received, an indication that the device address as installed is provided, that such device addressed is in fact ready and that the buffer is not busy. However, should a second half read cycle signal be received, then an ACK acknowledge signal will be generated independent of whether or not the buffer is busy or not. Each of the flip-flops in element 79 is cleared in response to the BSDCNB− signal received from the output of gate 26 shown in FIG. 8, via inverter 89.

Figure 10:
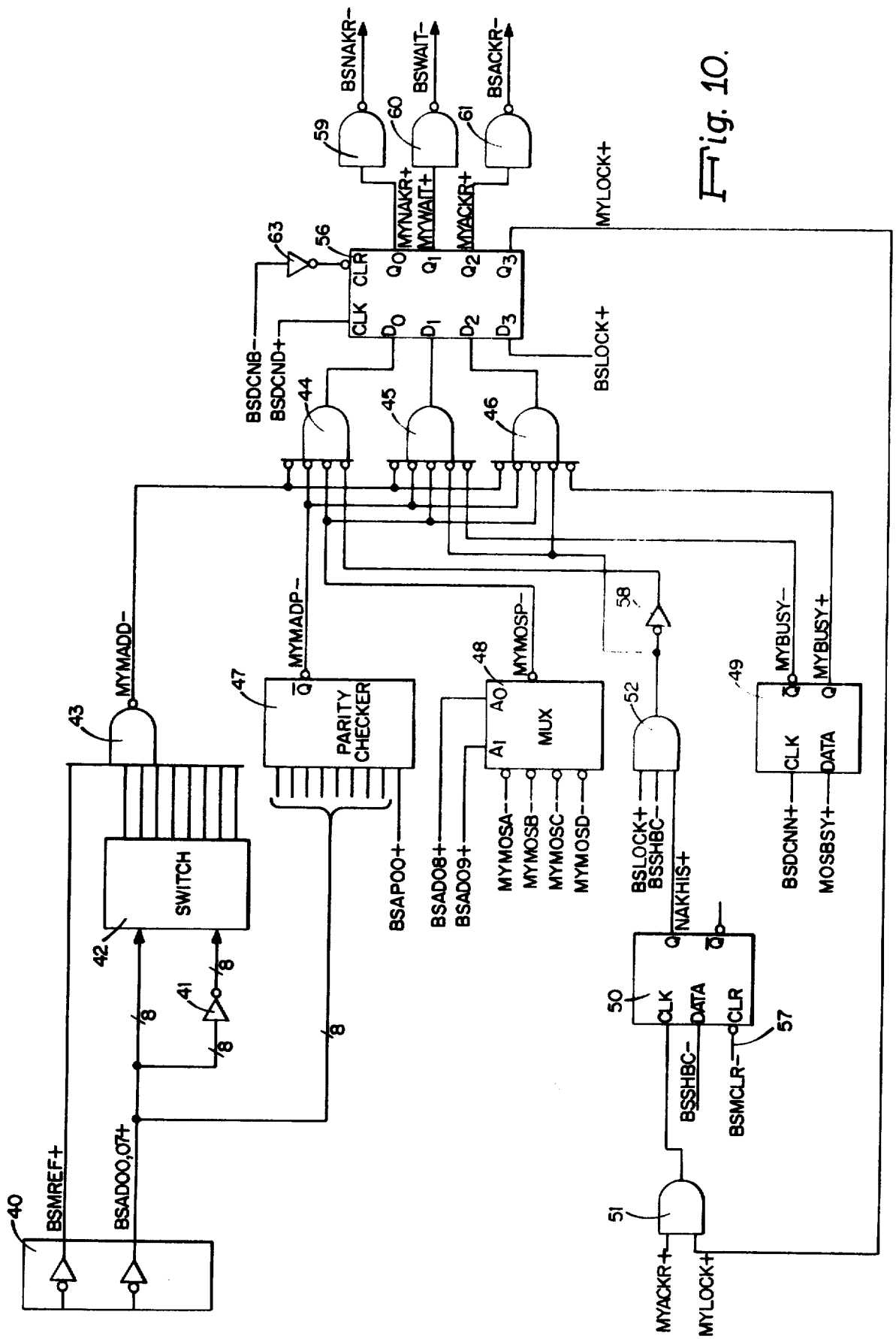
FIG. 10 illustrates bus interface logic of a typical memory controller coupled with the bus of the system of the present invention.

Having described a typical controller's address logic, such as controller's 210 or 214, as well as controller 21, typical address logic for a memory controller shall now be discussed. The memory controller logic of FIG. 10 is in many ways similar to the logic of FIG. 9. The address signal received by element 40 from the bus, is transferred as the bus address signals BSADO0+ through BSADO7+ in the format as shown in FIG. 2. The address signals from receivers 40 are also received at the inputs of parity checker 47 to be hereinafter described. The address signals from receiver 40 and also those at the output of inverters 41 are received by a switch 42 in the same manner as indicated fo FIG. 9. If the memory reference signal (BSMREF+) is a binary ONE, and the address compared by switch 42 generates all binary ONES at the output of switch 42, then NAND gate 43 will be fully enabled to provide a binary ZERO signal on the MYMADD− line which is received at one input of each of the three NOR gates 44, 45 and 46 which are utilized to generate the NAK, WAIT and ACK signals respectively. The memory cannot be addressed unless in fact the BSMREF+ signal is in the correct binary state.

As indicated, the addressed bits are received at the inputs of parity checker 47 which in addition receives the BSAPO0+ bit which is the address parity received over the bus. Parity checker 47 makes a nine bit parity check and generates at its $\overline{Q}$ output, a signal labelled MYMADP−, which if a binary ZERO partially enables the gates 44, 45 and 46, thereby indicating that the parity is correct.

A third input to the gates 44, 45 and 46 is received from the multiplexer 48 which is analogous to multiplexer 77 of FIG. 9. Multiplexer 48 receives by way of example four inputs labelled MYMOSA− through MYMOSD− which indicate whether or not any one or all of the memory modules connected to this particular controller are actually present in the system. This allows a memory to either have a full memory module array or allows it to have a partial array, that is, only one of such memory modules may be connected in the system. These four memory modules are further addressed and via multiplexer 48 are tested to determine if they are installed by means of the two bus address signals BSADO8+ and BSADO9+.

Thus, for differently configured systems, there may be one memory module connected to one particular memory controller and there may be two such modules connected to another such controller and in fact the different memory modules connected to the different controllers may be of different types. For example, in this manner a semiconductor memory may be connected to one controller whereas a magnetic core memory may be connected to another. Further, different size, i.e., more or less storage capacity, memory modules may be used. Further, by arranging the memory modules in different controllers, then different speed memories may be used thereby increasing the speed of system response. Also, for any given controller there is normally only a given power support and timing capability and in the normal case, that controller establishes the personality of the memories that may connect to it.

Accordingly, for example, if there are different types of memory speeds or different types of timing required such as for example between core and semiconductor memory, then a different controller must be utilized for each type. Further, by use of different controllers. the memories can be run faster since in fact they can be run essentially parallel in time with each other, even though they are connected to the same bus, however, only one transfer can take place at a time on a bus, the point being that the information will be ready in the memory without any access time required since in fact the access time has already taken place.

As indicated hereinbefore, each controller whether it be for memory or another peripheral device generally has its own specific address. Thus, for different memory controllers having a full complement of memory modules connected thereto, contiguous memory addresses may be provided. More specifically, assuming that each memory controller has four memory modules coupled thereto, and that each such module has th capability of about 8,000 words of storage, then each such memory controller will be able to provide access to 32,000 words of storage. With a full 32,000 words of storage coupled in the system for each memory controller, the addresses of the memories are contiguous. From an operations point of view, contiguous memory address is important not only for purposes of system addressing, but also for increased response in the system. As mentioned before, typically the memory controller can only provide service for a memory of a certain characteristic, i.e. a magnetic core memory cannot be coupled to the same memory controller as a semiconductor memory because of the basic timing differences associated therewith. The same is normally true for memories of different speeds or power requirements. Thus, assuming again that each memory controller may provide service for 32,000 words of memory, if only 16,000 words of memory are to be used for low speed memory and another 16,000 words are to be used for high speed memory, this means that two memory controllers must be used. However, this would typically mean that the memory addresses between the high speed and the low speed memory would not be contiguous because the memory controller addresses are 32,000 words apart. In this case, it is possible to provide contiguous memory addresses by allowing both of the memory controllers to have the same address. However, this would also mean that the respective memory module positions of the two controllers could not be both occupied in the same location in each such controller. More specifically, the first controller would utilize two 8,000 word storage locations in memory module positions A and B as indicated by the MYMOSA-- and MYMOSB- signals. The other controller would utilize the other two memory module positions, the presence of which would be indicated by the MYMOSC- and MYMOSD- signals. Thus, these two controllers appear in the system as if they were one controller. By way of further example, one such controller may have simply 8,000 words of one such memory coupled therewith in the form of one module, whereas the other memory module with the same address may have coupled therewith up to three such memory modules in the other three positions to accordingly provide 24,000 words of memory storage. This arrangement need not necessarily be limited to different types of memories, but in fact may address the problem of defective memory modules coupled with a controller. For example, a redundant memory module may be provided coupled with another controller whose device address may be set as may be appropriate upon detection of a failure in such memory module.

Referring again to the enabling of gates 44, 45 and 46, each of such gates in order to be enabled and allow a response from this particular memory controller, must receive its memory controller address, an indication that the module addressed exists in the system, and that the address parity is correct, as indicated by parity checker 47. The other inputs to the NOR gates are serviced from a combination of busy logic and lock history logic as presently described.

The memory controller busy signal is provided by flip-flop 49 and indicates that any one of the memory modules connected to this controller is in fact busy. This D-type flip-flop 49 is clocked by the BSDCNN+ signal. If a memory module is busy, then a WAIT signal will be generated. Thus, if the MYBUSY— signal at the $\overline{Q}$ output of flip-flop 49 is a binary ZERO, this enables, if the other conditions are met, gate 45 to be fully enabled and to set the associated flip-flop in element 56, it being noted that this is done when the BSDCND+ signal is received at the clock input of element 56. At this point it is noted that this flip-flop element 56 is cleared via inverter 63 when the BSDCNB— signal is received as was the operation for element 79 of FIG. 9. The acknowledge signal will be generated when a binary ZERO is generated at the Q output of flip-flop 49 as indicated by the MYBUSY+ signal coupled to one input of gate 46. It is again noted that the WAIT signal means that there will be a very short delay since the memory is still busy.

The other condition which indicates which of the ACK, NAK or WAIT signals is to be generated, is the lock signal which as indicated hereinbefore comprises a multi cycle bus transfer whereby a device can access a specific memory location without any other locked unit being able to break into the operation. The effect of this locked operation is extend the busy condition of the memory controller beyond the completion of a single cycle for certain kinds of operations. Devices attempting to initiate a lock operation before the last cycle of the sequence is complete will receive a NAK signal. The memory will however still respond to a memory request as shall be presently explained. It is noted that the intervening time between these cycles may be used by other units not involved in the transfer. A locked operation is used primarily where it is desirable for two or more units or devices to share the same resource, such as memory for example. The locked operation, which can include any number of bus cycles, is unlocked by the particular unit or device which has had control of the shared resource. While the shared resource is locked, other units desiring to access the shared resource will be locked out if such other units present the lock control signal. If the lock control signal is not presented, it is possible for such other unit to gain access to the shared resource such as for example to process an urgent request or procedure. Before any unit presenting the lock control signal gains access to the shared resource, it tests the resource to see whether it is involved in a locked operation and then during the same bus cycle, if the resource is not involved in a locked operation, it may gain access to the resource.

Thus, it can be seen that the locked operation for sharing a resource is one that is effective between those units which issue the appropriate controls, i.e., the lock control signal, and may be used for example in sharing a portion of memory in which a table of information may be stored. Further, if one of the units desires to change information in the shared resource, other units may be locked out so that they do not gain access to only partially changed information, but rather are allowed access only after all such changes have been made. A read modify write operation may be involved in such case. By use of the locked operation, it can be seen that a multiprocessing system may be supported. For example, with two central processing units connected to the same bus 200 both may share the memory units connected to the bus without interference if the locked operation is used.

It is noted that the BSSHBC— signal for the locked operation, as shall be seen, is used in a somewhat different manner than has been heretofore discussed. During the locked operation, the BSSHBC— signal is issued by the unit attempting to share a resource both to gain access to the shared resource by menas of a test and lock procedure and to unlock the shared resource when it has completed its locked operation.

Thus as can be seen by FIG. 10, a lock history flip-flop 50 is provided, which if set indicates that a locked operation is in process, thereby enabling a NAK signal to be issued to a requesting unit via driver 59. Assuming that the logic of FIG. 10 represents the bus 200 interface logic for the shared resource, the BSLOCK+ signal (binary ONE state) is received by both AND gate 52 and flip-flop D3 of element 56. Element 56 thereby generates the MYLOCK + signal which is received at one input of AND gate 51. If the lock history flip-flop is not set, the NAKHIS+ signal will be a binary ZERO thereby, independent of the state of the other two inputs to gate 52, generating a binary ZERO at one input of gate 46. If all inputs of gate 46 receive a binary ZERO, thereby indicating that the current address for this unit and device were received, and that the common element or buffer is not busy, then an ACK signals will be generated via element 56 and driver 61 in response to the BSLOCK+ signal. The ACK signal will fully enable AND gate 51 to set the history flip-flop 50 in response to the binary ONE state of the BSSHBC— signal at the D input thereof which is received with the binary ONE state of the BSLOCK+ signal at the commencement of the locked operation. Thus, a test and lock operation is performed during the same bus cycle.

If flip-flop 50 had already been set at the time of the receipt of the binary ONE state of the BSLOCK+ and BSSHBC— signals, then a binary ONE signal will be generated at the output of AND gate 52 thereby generating a binary ZERO state at the output of inverter 58 so as to enable AND gate 44, all other conditions having been met, to generate the NAK signal. Thus, the test and lock operation would have produced a NAK response inhibiting another unit from using the shared resource.

Once the unit using the shared resource is through with its operation, it must unlock the resource. This is done by receipt from the user unit of the binary ONE state of the BSLOCK+ signal and the binary ZERO state of the BSSHBC— signal. This enables the logic of FIG. 10 to provide an ACK response, enabling gate 51 and thereby effectively resetting history flip-flop 50 because of the binary ZERO state of the BSSHBC— signal. The shared resource is now free to make an ACK response to other units.

It can be seen that the shared resource will only lock out other units which present the binary ONE state of the BSLOCK+ signal. If a unit, for example, desires to gain access to a shared resource which had its history flip-flop set so that the NAKHIS+ signal is a binary ONE, then, if the BSLOCK+ signal is a binary ZERO, the output of AND gate 52 will be a binary ZERO, thereby disabling a NAK response and enabling, dependent upon other conditions, either a WAIT or ACK response. Thus, a unit may gain access to a shared resource even though it is involved in a locked operation.

Thus, it can be seen that the generation of a WAIT signal from any one of the controllers allows a device or controller of higher priority to break into the sequence of the bus cycles and use the bus as necessary. If there is not a higher priority unit which is requesting service, the particular master/slave arrangement will be maintained until the acknowledge is received by the master thereby ending the WAIT condition. Following this, another user is allowed to use the bus. Thus, the BSDCNN+ signal allows a slave to generate any one of three responses, either the NAK, WAIT or ACK signals. At the end of any one of these responses, a new priority net cycle occurs and this particular device gains access to the bus or another higher priority device wins the bus. It should be understood at this point that signal states on the bus are the inverse in binary state to those signals shown internal to the units. For example, the memory reference signal is referred to on the bus, between for example drivers 59, 60 or 61 and receivers 40, to be in one state and in the opposite state in the controllers themselves. Further, as indicated hereinbefore, a fourth response between any of the controllers connected on the bus is that there is no response at all. Thus, if one of the masters is calling for service from the memory and this memory is not installed in the system, a time out element, well known in the art, will generate a signal after a certain period of time, such as for example five microseconds, thereby generating a NAK signal. At that point, a central processor may take action such as by an interrupt or trap routine.

Referring again to the operation of the memory busy flip-flop 49, the data input is coupled to receive the MOSBSY+ signal which is asynchronous to the bus operation. This signal may be received at any time regardless of the operation which is occurring on the bus for any controller. When the BSDCNN+ signal is received from the master at the clock input of flip-flop 49, a history is stored as to the state of the memory, i.e. whether it is busy or not at that time. Thus, this eliminates confusion in the response to the bus cycle. Without the history retention provided by flip-flop 49, it would be possible to start out the bus cycle in a WAIT condition and end up the same bus cycle in the state which generates an ACK condition. Thus, both responses would be made during the same bus cycle which would thus be an error condition. By use of history flip-flop 49, the response is fixed as to the condition which the controller was in at the time the BSDCNN+ signal is received, thereby allowing an asynchronous response and regardless of the tolerance or difference in memory speed.

Figure 11:
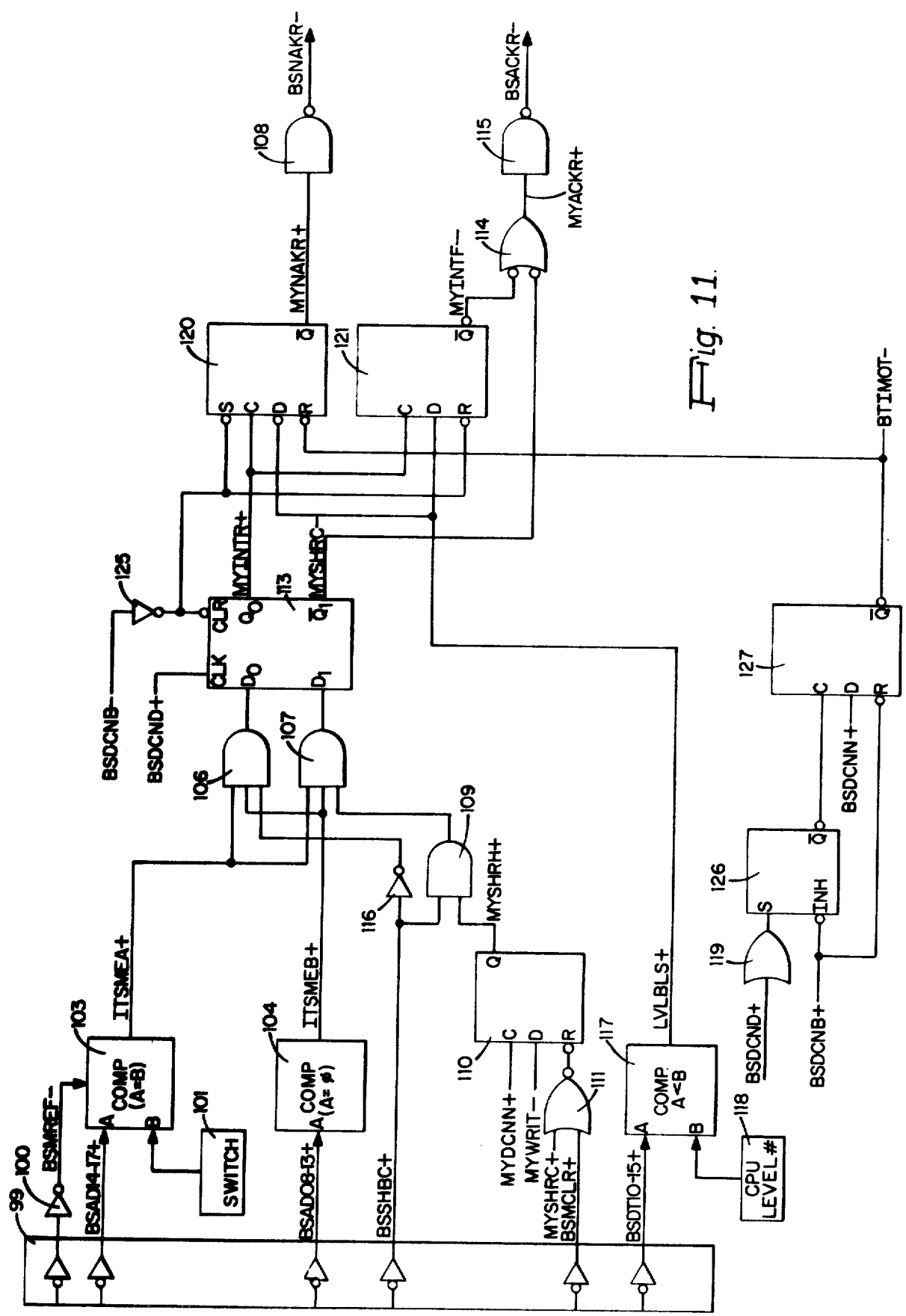
FIG. 11 illustrates bus interface logic of a data processor coupled with the bus of the system of the present invention.

Now referring to the typical central processor bus coupling logic of FIG. 11, the signals are received from the bus by means of the receivers included in element 99. The memory reference signal BSMREF— is received by one of such receivers and inverted by means of inverter 100 and provided to one input of comparator 103 so as to enable such comparator if the address being recieved is not a memory address. One of the inputs for comparison by comparator 103 is the data processor address bits which in this case by way of example are four in number and are indicated as the BSAD14+ through BSAD17+ signals. This address received at one input of comparator 103 is compared with the address set by for example the hexadecimal switch 101 in the data processor itself. When the received address and the switch 101 provided address are compared and found to be equal, then comparator 103 generates ITSMEA+ signal which partially enables gates 106 and 107.

Further address bits BSAD08+ through BSAD13+ are received at the inputs of comparator 104 which determines whether or not these bits are all ZEROS. If they are all ZEROS, then the ITSMEB+ signal is generated to also partially enable gates 106 and 107. Enabling of further input of either gates 106 or 107 will effectively set a respective flip-flop in element 113.

The other input to gate 106 is a second half bus cycle BSSHBC+ signal which is coupled to gate 106 via inverter 116. The second half bus cycle is also received at one input of AND gate 109. The other input to gate 109 is from the Q output of the second half read history flip-flop 110. The second half read history flip-flop is utilized to remember that the data processor issued its MYDCNN+ signal, i.e., the setting of this device's grant flip-flop 22, and that the central processor also sent the signal entitled MYWRIT−, which implies that the data processor is expecting a response cycle from the slave. Thus with such a two cycle operation, the second such cycle presents the expected data to the central processor, and the flip-flop 110 will identify this data as being that which the central processor requested by the fact that the history flip-flop 110 has generated the MYSHRH+ signal at the Q output thereof. Flip-flop 110 is reset via NOR gate 111 if the bus clear signal BSMCLR+ is received of the second half bus cycle has been completed as indicated by the MYSHRC+ signal. The MYSHRC+ signal is derived from one of the outputs of element 113 to be hereinafter discussed.

Thus AND gate 107 will be fully enabled if two of the inputs thereto indicate that this is the addressed device and that from the other input thereof, there has been a second half bus. cycle as indicated via AND gate 109 from history flip-flop 110. Thus, by the enabling of AND gate 107 the MYSHRC− signal will be generated and will be coupled to one input of NOR gate 114. NOR gate 114 will provide an ACK signal, (BSACKR−) via driver 115.

Gate 106 will be fully enabled when the proper unit address is recieved and if this is not a second half bus cycle, which thereby generates a positive pulse labelled as the MYINTR+ signal at the output of the respective flip-flop included in element 113. The MYINTR+ signal causes the logic of FIG. 11 to determine whether or not an ACK or a NACK signal will be generated. Which one of such signals is generated will depend on the interrupt level that is presently operating in the system as compared to the interrupt level of the device seeking processing time.

This decision regarding whether or not the interrupt level is sufficient is determined by means of comparator 117, which is a comparator for determining whether or not the A input is less than the B input. The A input of comparator 117 receives the BSDT10+ through BSDT15+ signals which indicate in the format shown in FIG. 5, the interrupt level of the device coupled with the bus which is seeking data processing time. There are a plurality of interrupt levels provided in the system. Interrupt number level O receives the highest possible accessibility to data processing time and accordingly is non-interruptable. Thus the lower the interrupt level number, the less chance there is that such device's ongoing processing will be interrupted. Thus if the level number received at the A input of comparator 117 is less than the current level operating in the data processor as indicated by the level number in block 118, then the device seeking to interrupt as indicated by the signal received at input A will in fact be able to do so. If the A input is equal or greater than the B input, then the LVLBLS+ signal will not be generated and a NAK signal will be provided by the driver 108 and flip-flop 120, as shall be hereinafter described.

Thus if the interrupt level received at input A of comparator 117 is less than that received at input B, the LVLBLS+ signal will be a binary ONE and will be coupled to the D input of both flip-flops 120 and 121, it being noted that the D input of flip-flop 120 is an inversion. If the A signal is equal to or greater than the B signal as indicated by comparator 117, then a binary ZERO signal will be generated for the LVLBLS+ signal which will be received at the negation input of flip-flop 120. This will generate the NAK signal if the MYINTR+ signal is received at the clock input of flip-flop 120 by the setting of the respective flip-flop in element 113. If the level was sufficient, i.e. if the A input was less than the B input as indicated by comparator 117, then a binary ONE will be generated at the LVLBLS* signal and accordingly the MYINTR+ signal will clock this to the Q output of flip-flop 121 into one input of NOR gate 114 which via driver 115 will generate the ACK signal. Thus if the MYNAKR+ signal if a binary ONE, then the NAK signal will be generated and if the MYINTF− signal is a binary ZERO, an ACK signal will be generated. The flip-flops in element 113 are clocked and cleared by inverter 125 in the same manner as previously discussed for similar flip-flop type elements. It should be noted that an ACK signal will be generated independent of the indication by comparator 117, if in fact this is the second part of the second half bus cycle. In such event, the MYSHRC−signal in one of the flip-flops of element 113 is coupled in the binary ZERO state to the other input of NOR gate 114 so as to generate the ACK signal thereby overriding any indication from flip-flop 121.

As indicated hereinbefore, the BSDCNB- signal via inverter 125 resets flip-flop 121 and in addition sets flip-flop 120, thereby initializing the flip-flops following the bus cycle. In addition, flip-flop 120 is reset by the logic associated with flip-flop 127 which generates a BTIMOT-signal indicating a time out condition, i.e., that a non-existent device was addressed and that in fact no response, neither a NAK, an ACK or a WAIT has been generated by any potential slave device. Accordingly, there is provided a one-shot multivibrator 126 which may be set to have a 5 microsecond period for example. This miltivibrator 126 is triggered by the receipt of the BSDCND+ signal, i.e. the strobe signal, which is received at the input of buffer 119. Since the timing of the multivibrator 126 is in motion, if a BSDCNB+ signal is not received which signal indicates the end of the bus cycle, then after the period set by multivibrator 126, the BTIMOT- signal is generated at the $\overline{Q}$ output of flip-flop 127 via the clocking of the BSDCNN+ signal received at the D input of flip-flop 127, it being noted that the BSDCNN+ signal indicates that the bus cycle is still in process. The BTIMOT− signal operates on flip-flop 120 to generate a NAK signal. If on the other hand, the BSDCNB+ signal terminates before the end of the period set by multivibrator 126, the timing of multivibrator 126 is terminated and flip-flop 127 is prevented from generating the signal BTIMOT−.

It is noted that the data processor logic in FIG. 11 generates either a NAK or ACK signal, however a WAIT signal is not so generated by the data processor logic. The reason for this is that the data processor always has the lowest priority and accordingly, if it generates a WAIT signal, the other devices generating their requests to the data processor for service will possibly experience a hang up on the bus, if for example a higher priority device was the master to which the central processor responded with a WAIT signal. Thus, just because the higher priority device is waiting for the lowest priority device, i.e., the central processor, other devices will be disabled from using the bus.

FIG. 12 illustrates a clock system which may be utilized for generating a clock cycle from which clock pulses are derived for use in association with the present invention. The clock cycle is generated basically by the use of the delay element 310, which may in a preferred embodiment by a delay line, and the inverting function of NAND gate 312. This is a well known technique by which a change in level at the output of gate 312 as depicted by waveform A of FIG. 14 is propagated and thereby produces through the delay line 310 waveform B of FIG. 14. A clock cycle has a period equal to twice the delay time of the delay element 310 and the delay of NAND gate 312. It is noted that waveform B, for purposes of simplifying the discussion relating to the operation of the clock system, has been shown as if there were no delay associated with either NAND gate 312 or 314. It is noted, however, and assuming the delay of NAND gate 312, that the duration of each level of the square waves represented by waveforms A and B would be equal to the delay time of delay element 310 plus the delay produced by NAND gate 312 and that waveform A would be delayed from the timing of waveform B by the delay time of NAND gate 312. It is noted that resistor 324 is included at the output of delay element 310 in order to provide the proper termination circuit, thereby reducing signal reflections and noise in the system. The simple use of this delay element 310, inverter function and terminating resistor 324 to produce the square wave is well known in the art.

It is also well known to tap off from such delay element 310 anywhere from the input thereof to the output thereof with one or more circuits in order to provide a clock pulse during the clock cycle. By way of example, two such circuits are shown in the apparatus of FIG. 12. Such circuits are shown as latching circuits 318-1 and 318-2. Circuit 318-2 is similar to circuit 318-1 and accordingly is not shown in detail. As shown, the pulse produced by logic 318-2 starts when a pulse produced by logic 318-1 terminates, because of the common tap for the two circuits.

The operation of representatives logic 318-1 is as follows. As can be seen by waveform A, the change in state from a high level to a low level, i.e., from a binary ONE to a binary ZERO, propagates through the delay line until received at point 311, at which time such resulting signal as shown by waveform C is received at the top input of NAND gate 320. This causes such top input of NAND 320 to change from a binary ONE to a binary ZERO, it being noted that the bottom input of NAND gate 320 is already in the binary ONE state. Thus, initially, both inputs to NAND gate 320 are binary ONEs and the output thereof is a binary ZERO as indicated by the truth table of FIG. 13. Therefore, the bottom input of NAND gate 322 is a binary ZERO and the top input is a binary ONE. When the top input of NAND gate 320 goes to a binary ZERO state, the output of NAND gate 320 changes to a binary ONE state and accordingly with the binary one state at both inputs of NAND gate 322, the output thereof, as represented by waveform F, goes from a binary ONE state to a binary ZERO state. When such negative going transition is received at point 313 at the top input of NAND gate 322, the top input is accordingly a binary ZERO and the output of NAND gate 322 as represented by waveform F, goes back to a binary ONE state. It is noted that waveform F is the clock (CLK) signal which by way of example is explained with respect to the operation of the apparatus of FIG. 16. The latching circuit 318-2 operates in the same way and is triggered when a negative going waveform is received at point 313 and is again triggered to terminate the pulse when a negative going waveform is received at point 315. This is represented by waveform G.

The square wave or clock cycle, as represented by waveform A, is accordingly repeated unless in fact NAND gate 312 is effectively disabled. Normal conditions, i.e., with no stall condition for the NAND gates 312 and 314 are as follows. The bottom input 317 of NAND gate 312 is normally a binary ONE state. Such binary ONE state thereby enables NAND gate 312 to be controlled by the control input 319, i.e., the top input of NAND gate 312 so as to reproduce the binary state on control input 319 at the output of NAND gate 312 as represented by waveform A, waveform A being the inversion of the input on line 319. Referring to the truth table of FIG. 13, it can be seen that if the input, in this case as shown by the truth table by Input 2, is a binary ONE, then the output of the NAND gate will be the inversion of Input 1.

The inputs to the NAND gate 314 are the stall control line 316 at the top input thereof and the output of NAND gate 312 at the bottom input thereof. The stall signal is normally a binary ZERO indicating that there will not be any stall or delay in generating the clock cycle. Accordingly the clock cycle will continue to be generated in a repetitive manner. Because of the fact that the stall signal on line 316 is a binary ZERO under what will be termed as normal conditions, the output of NAND gate 314 will remain in the binary ONE state thereby providing a binary ONE signal on line 317 to enable such normal operation, independent upon whether waveform A is in the binary ONE or binary ZERO state. This is true because as can be seen from the truth table, the only time that a binary ZERO may be generated at the output of a NAND gate is when there are two binary ONE inputs, and accordingly, the stall input being a binary ZERO, a binary ZERO output cannot be generated.

As shall be presently explained, when a stall signal is received, i.e. when the stall signal becomes a binary ONE, the clock system will not be interrupted or stopped until in fact such apparatus completes the present clock cycle, i.e., at the time the stall signal goes to the binary ONE state. Further, as shall be explained, a stall signal in the binary ONE state received during a clock cycle and which returns to a binary ZERO state during the same clock cycle will have no effect on the system. This means that, for example, the device generating such binary ONE stall signal, and which device changes its intent to cause a stall condition, will have no effect upon the generation of such clock cycle if in fact such stall signal becomes a binary ONE and then a binary ZERO during the same clock cycle. This, as can be seen, further provides an advantage of the system in that the noise on the stall line 316 will not cause any errors in the system since in fact noise will be generated typically for only a short period of time. It shall be further explained, that the clock system is adaptive to commence the generation of further clock cycles after being stalled by the binary ONE stall signal when in fact the stall signal again becomes a binary ZERO. Such clock cycle generated after the stall signal goes from the binary ONE state to the binary ZERO state is so generated without any delay except for the propagation and gate delays which are inherent in the system. It should be understood that clock pulses may have been provided during the latter half of the clock cycle by utilization of inverters at selected delay element 310 tap points and that such clock pulses during the latter half of the clock cycle would not have been interrupted for the same reasons as noted above.

Assuming that waveform A is in the beginning of the clock cycle, i.e., that waveform A has just gone from the high binary ONE state to the low binary Zero state, and assuming that the binary ONE state of the stall signal has been received on line 316, the output of NAND gate 314 continues to be a binary ONE. Accordingly, the normal operation of the clock system continues. This is true because a binary ZERO state at the respective inputs of a NAND date as indicated by the truth table of FIG. 13 will produce a binary ONE output. When waveform A goes from the binary ZERO state to the binary ONE state, the output of NAND gate 314 will change. However, it is noted that by the time waveform A goes back from the binary ZERO state to the binary ONE state, that in fact the clock pulse as indicated by waveforms F and G have already been generated. Accordingly, there is no effect by the stall signal on the clock pulses as indicated by waveforms F and G. Thus, when the bottom input of NAND gate 314 goes from the binary ZERO state to the binary ONE state, binary ONEs will be at both inputs of NAND gate 314 and the output thereof will be a binary ZERO on line 317, which is one input to NAND gate 312. With a binary ZERO on line 317, the output of NAND gate 312 will become a binary ONE and will remain a binary ONE independent of the binary state of the signal on line 319. Thus, waveform A will continue to be in the binary ONE state for the second half of the clock cycle and thereafter until the stall signal is terminated, i.e., until the stall signal goes back to the binary ZERO state.

At such time that the stall signal goes back to the binary ZERO state, the output of NAND gate 314 will, after the gate delay of NAND gate 314, become a binary ONE and accordingly will enable NAND gate 312 to pass in inverted from the binary state received on line 319, to the input of delay element 310. Since the waveform on line 319 is in the binary ONE state, then this will mean waveform A will in fact go to the binary ZERO state thereby starting the clock cycle without delay except for the gate delays introduced by NAND gates 314 and 312 in succession. Thus, it has been seen that the stall signal, when received during a clock cycle, will not interrupt the generation of such clock cycle, nor the generation of the clock pulses during such clock cycle, and it has further been seen that the clock cycle will begin again in an adaptive manner within two gate delays after the stall signal has terminated, i.e., has gone to the binary ZERO state.

It can be further seen that if a stall signal in the binary ONE state is received on line 316 during the first half of the clock cycle, i.e., when waveform A is in the binary ZERO state, and terminates, i.e., such stall signal goes back to the binary ZERO state, while waveform A is still in the binary ZERO state or in fact after it has gone to the binary ONE state in the second half of the clock cycle, that the operation of the clock system will not be interrupted. This is so because as has been discussed hereinabove, the change in the output of NAND gate 314 was not seen until in fact waveform A went from the binary ZERO state back to the binary ONE state. Further, by the illustrated embodiment, the clock pulses as represented by waveforms F and G had already been generated.

It can also be seen that due to the nature of the operation provided by such stall signal, that the system may be initialized so that in fact the first clock cycle starts with waveform A going from a binary ONE to a binary ZERO state. Such initialization may for example occur after the circuit is first powered up, i.e., energized, at which time the stall signal would be provided in the binary ONE state, and thereafter, for initialization purposes changed to the binary ZERO state so as to start the clock cycle at the beginning thereof.

It can thus be seen that the clock system is responsive to a stall signal but only after the completion of the current clock cycle, and only if such stall signal continues after the completion of the current clock cycle, it being noted that such clock system provides the advantage of not responding to such stall signal if such stall signal is removed during the present clock cycle. It has further been seen that yet another feature of such system is that such clock cycle is immediately initiated after a given short duration after the stall signal is removed.

Synchronization of the data transmitted over the bus 200 is achieved to a large extent by stalling and unstalling the clock system of FIG. 12. By way of example, the transfer of data between the central processor 206 and memory 202 will be explained, the clock in this case being in the central processor 206. Such synchronization is achieved basically by the logic of FIG. 16. The operating cycles necessary for performing a read or write operation between the central processor and the memory over the bus 200 are shown in FIGS. 15A, 15B and 15C. There are two possible read sequences and one write sequence. The three sequences are shown in FIGS. 15A and 15B. There are two possible clock stalls in the diagrams of FIGS. 15A and 15B, occurring respectively in blocks 15A-2 and 15A-4 and in blocks 15B-2 and 15B-3. Each of such blocks represents a cycle of interval during which time various operations may occur within the respective units coupled to the bus and over the bus 200. It can be seen in the timing diagram of FIGS. 17 and 18, that these blocks represent cycles or intervals between clock pulses, which, unless stalled, are generated synchronously so that the time period therebetween is equal.

By FIG. 15A, in block 15A-1, a read operation may be commended, and other operations such as internal transfers, may occur as well. During the time represented by block 15A-2, various operations may also take place in the central processor or master in this case and in addition, a stall will be enabled and an actual stall may occur in order to guarantee that the slave unit, whether it be the memory or a controller unit has received the information from the central processor. The second stall in block 15A-4 is necessary to guarantee that the central processor has received the data it has requested by the read operation. Such stall condition is enabled by the generation in the system of an MSTAL signal during block 15A-3. It shall be seen that this MSTAL signal may be produced by the control words or so-called firmware included in the control store or the system of the present invention. It is again noted that the time interval represented by block 15A-2 is not utilized for this particular for this particular read operation but may be utilized by the central processor for other operations. The reason for this is because of the time constraints which may be placed on the system. For example, it may be known that once a request is made, it may take more than one clock cycle for a response. On the other hand, in FIG. 15B, block 15B-2 is shown to occur directly following the read request in block 15B-1 in which case a response is assumed during the second clock cycle as represented by the interval of block 15B-2. In blocks 15A-4 and 15B-3, data received in response to the read operation is received by input register 358 and then placed on the internal bus 370, as shown in FIG. 16, from which it may be sent to any one of a number of locations such as for example an arithmetic and logic unit not shown. Thus, for the read operation, when the receipt of data is expected in response to a request, and to ensure that such data is received, the stall signal is generated by addressing the appropriate location in the control store 350 which includes a stall signal (MSTAL) stored therein. This is not required in the case of a write operation where no data is expected back. In such write operation as represented by FIG. 15C, the data to be sent out during the write operation is placed in register 360 following which, in block 15C-2, the write operation is requested and a stall takes place in block 15C-3 to ensure that the data is received by the memory unit.

Now referring to FIG. 16, the apparatus for the asynchronous to synchronous interface of the present invention is shown. The timing relationships with respect to the apparatus of FIG. 16 will be hereinafter discussed with respect to FIGS. 17 and 18. Bus 200 is provided for coupling the basic units in the system. One of the units coupled to the bus 200 may be the central processing unit 206 which shall be discussed by way of example. The central processing unit may include an internal bus 370 to which is coupled many of the elements in the system which may for example communicate or transfer information to the external bus 200 by means of input register 358 and output register 360. Input register 358 is coupled for receiving information from the bus 200 and is enabled for loading in response to an acknowledgement signal (MYACKR+) which is generated by the central processing unit. The information received in register 358 may remain there until further information must be received from the bus 200. The output register 360 is loaded with information from the internal bus 370 in response to the output signal decoded by decoder 362 from two bits of a firmware word addressed in the control store 350, namely bits 30 and 31 to be hereinafter discussed.

Figure 17:
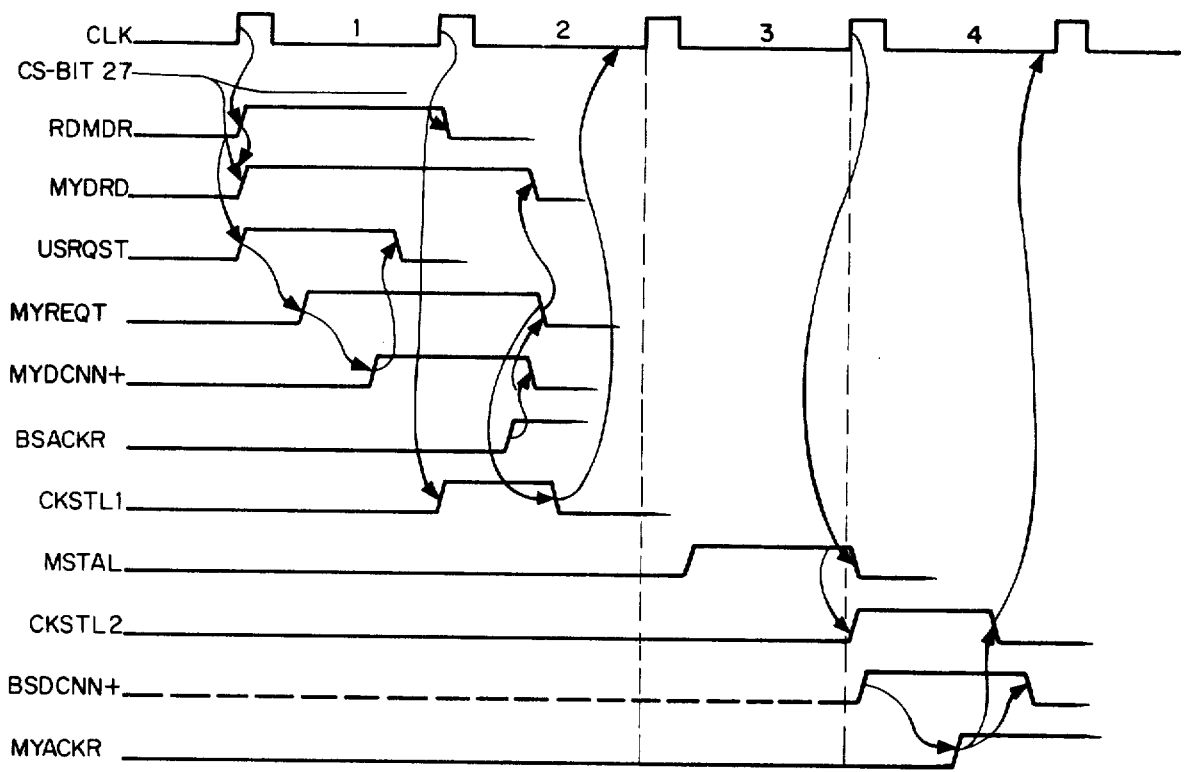
FIG. 17 includes timing diagrams of the operation of the present invention without an actual stall condition.
Figure 18:
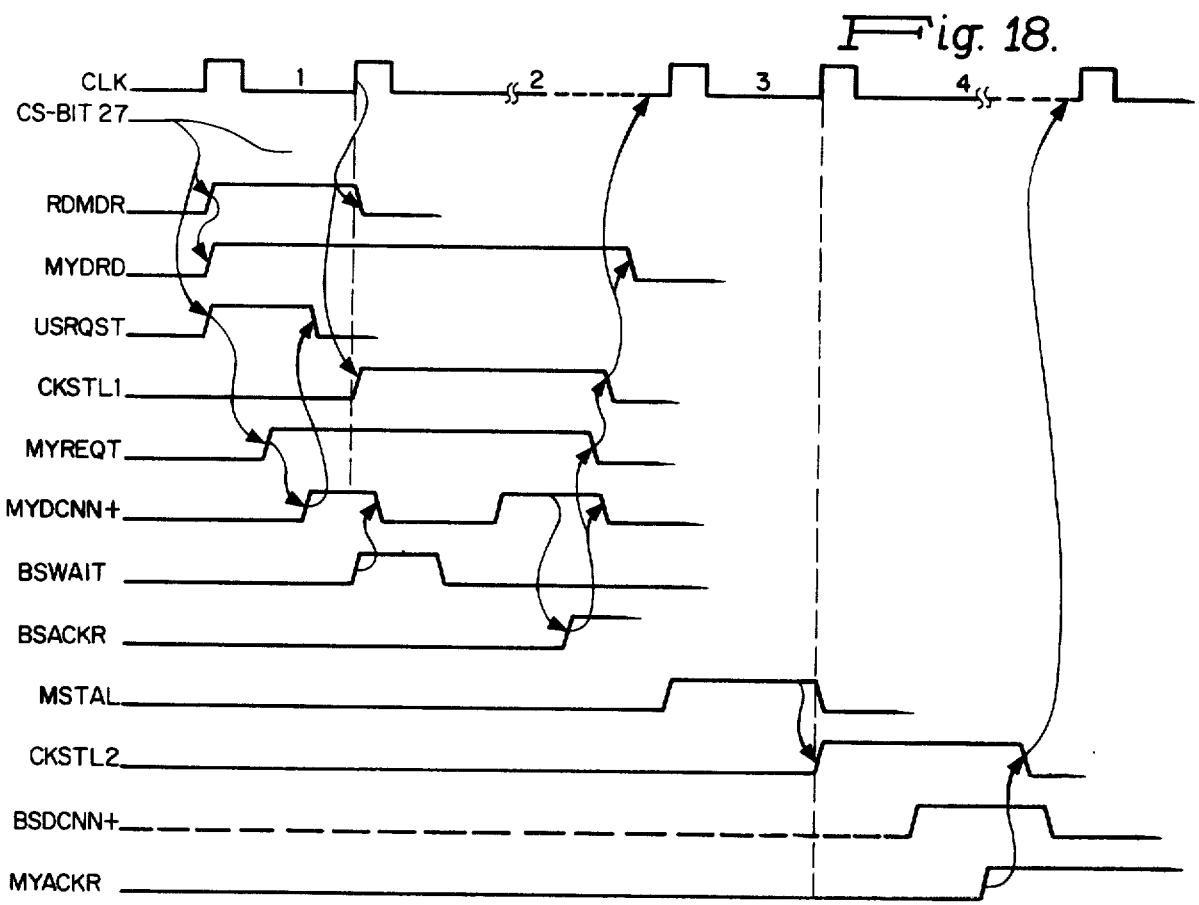
FIG. 18 includes timing diagrams of the operation of the present invention with an actual stall condition.

The apparatus of FIG. 16 is coupled to produce a stall signal on line 316 under certain conditions. The stall signal on line 316 is coupled to the stall circuitry of FIG. 12 at the stall input, the extension of line 316. The purpose of the stall signal is to ensure that information sent to an addressed unit has been received and to further ensure that information is received by one unit from another unit coupled with the bus 200. The stall signal couples to delay the synchronous clock pulses as shown in FIGS. 17 and 18 if the expected response is not forthcoming within the period of the clock cycle during which a response is expected. If the response is received within the time provided, then the stall condition although enabled will not actually be incurred, i.e., there will be no stall. If such response is not received within the allotted period, then such stall condition actually occurs, i.e., the time between the respective clock pulses (clock cycle) is increased.

The stall signal on line 316 is produced via OR gate 372 which includes four inputs by which a stall signal may be produced. First, for example, under system control, the master clear signal may be produced in order to initialize the system. Further, the operator may initialize by providing a signal by use of for example a switch on a control panel of the system. The other two inputs to OR gate 372 are the CKSTL1 and the CKSTL2 signals. The CKSTL1 signal is produced to ensure that data has been received by the slave unit, whereas the CKSTL2 signal is produced to ensure that data to be received by the requesting unit has actually been received.

The CKSTL signals are produced in response to hardware signals and control store 350 instructions. The control store 350 includes a plurality of locations, each location including information for controlling the operation of the system and each including segments for generating the address of the next location in the control store 350 to be addressed. Logic to provide such address includes test logic 356 and next address generation logic 354. Depending upon various test conditions or signals which may be received by sources coupled to the internal bus 370, and the next address information from the last addressed control store location via lines 351 and 353, test logic 356 produces signals used by the next address generation logic 354 to address control store 350. Such test logic 356 and next address generation logic 354 are well known in the art and may be seen for example in U.S. Pat. Applications having Ser. No. 674,517 and 674,698, both of which were filed on Apr. 7, 1976.

Each time the control store 350 is addressed, the so-called firmware word or control store word is received by register 352. The firmware word comprises many fields including next address generation information received on lines 351 as well as operation code command information, such as shown for example in the fields represented by the two top blocks of register 352 may be coupled to transfer information over the internal bus 370. These fields may, for example, be coupled to transfer information or signals to special logic as for example shown with respect to those signals received from the fields represented by bits 26, 27, 30 and 31. The use of such bits will now be described in detail. Bits 30 and 31 provided control of the output register 360, as decoded by the decoder 362. The bits 30 and 31 both being binary ZEROs indicates no operation, whereas a binary ONE indication from both of such bits indicates a load signal to the output register 360. In the embodiment where for example such output register 360 may be utilized as a shift register, which shift register operation is not needed for the present invention, if either bits 30 or 31 is a binary ONE, and the other bit is a binary ZERO, this will indicate a shift operation with the shift direction being indicated by the identity of the bit which is in the binary ONE state.

Bits 26 and 27 of the firmware word control whether the operation is to be with the main memory, or a controller whether there is to be a stall condition. When both of such bits are a binary ZERO, this indicates no operation. When both of such bits are a binary ONE, this indicates either a read or a write operation with the main memory. If bit 27 is a binary ONE and 26 is a binary ZERO then this indicates an opeaeration with a controller. If a bit 26 is a binary ONE and bit 27 is a binary ZERO this indicates a clock stall condition. If bit 26 is a binary ONE and bit 27 is a binary ZERO, then decoder 368 coupled thereto, will generate the MSTAL signal. On the other hand, if bit 27 is a binary ONE, this will generate the RDMDR signal which means that the firmware data is ready. This will generate the user request to the priority logic of FIG. 8.

Either one of the clock stall signals will be activated but not produce an actual stall unless such signals are present at the end of the clock cycle, in response to either bit 27 being a binary ONE thereby indicating that there is an operation with either a controller or a memory, or by generation of binary ONE in bit 26 which indicates a control store enabled clock stall condition. With bit 27 at the output of control store 350 as a binary ONE, at the occurrence of the next clock pulse, the output of flip-flop 364 which is the My Data Ready Signal (MYDRD) will be in the binary ONE state at which time bit 27 as well as the entire firmware word will be loaded into register 352. With bit 27 in the binary ONE state stored in register 352, such state will be transferred to the output of flip-flop 366 at the next clock pulse so that the CKSTL1 signal is activated thereby enabling the stall signal on line 316. Thus a stall signal is enabled each time there is an operation with either a controller or a memory or in fact any unit coupled with the central processor via the bus 200. A response from the bus acknowledging a request will reset flip-flop 364. Flip-flop 366 which produces the CKSTL1 signal will not be reset until the MYREQT signal is generated, such signal being generated at the output of flip-flop 17 in FIG. 8 basically in response to either a NAK signal or an ACK signal from the slave device. The control store generated stall signal (MSTAL) at the next occurrence of a clock pulse causes the output (CKSTL2) of flip-flop 374 to be in the binary ONE state thereby also enabling a stall condition. Flip-flop 374 will be cleared via OR gate 376 if the central processor generates an ACK signal or if the slave unit generates a NAK signal.

Thus for the situation where it is important to ensure that data from the central processor has been received by the slave, the stall signal will not be disabled unless there is either an acknowledgement of the fact that the information was received by the slave or a NAK indication indicating that such slave unit is busy at this time. As will be seen, a WAIT signal generated by the slave unit will in most cases cause an actual stall condition. In those situations where it is important to ensure that data expected for receipt from a previous slave has been received, the stall signal will not be reset unless in fact the central processor receives a negative acknowledgement (NAK) from the unit which was to provide the information, or in fact if the central processor acknowledges the actual receipt of such information.

Now with reference to FIG. 17, the operation of the apparatus of FIG. 16 is illustrated for the case where there is no actual stall produced in the system. It is noted that for ease of explanation all signals in FIGS. 17 and 18 are shown to go positive (the binary ONE state) when actuated. There is shown a series of synchronous clock pulses, the first of which is received at the start of interval No. 1, the second of which is received prior to interval No. 2, etc. The intervals represent clock cycle intervals. These clock pulses are synchronous unless there is an actual stall produced by the system. As illustrated in FIG. 16, there is no such actual stall. The manner in which such clock signals will be caused to be delayed and accordingly asynchronous with the operation of the system, is shown in the timing diagram FIG. 18.

At the rising edge of the first clock pulse and with bit 27 of the firmware word indicating the user request, the RDMDR signal goes to the binary ONE state meaning that the control storage word is now in control store register 352 and is ready for use. Further, the MYDRD and USRQST signals also then go to binary ONE state. The MYDRD signal will remain in the binary ONE state until the slave provides an ACK response. On the other hand, the RDMDR signal may back to a binary ZERO state upon receipt of the next clock pulse, i.e., when register 352 is again loaded. The USRQST signal is that signal which is generated at the output of the flip-flop 15 of the FIG. 8 in response to the user request as indicated by bit 27 of the firmware word. The USRQST signal will be reset upon receipt, for example, of the MYDCNN+ signal as shown in FIG. 8, which signal indicates that the master unit in which this MYDCNN+ signal was generated, has gained access to the bus. The USRQST signal going to a binary ONE state ultimately activates the BSREQT− signal, which signal is basically the output of flip-flop 17 via gate 18. Thus, the BSREQT− signal indicates a request for access to the bus by one of the units coupled with the bus.

As described hereinbefore, once the requesting unit has gained access to the bus, its MYDCNN+ signal is generated, i.e., as shown in FIG. 17, it goes from a binary ZERO to a binary ONE state. Although not shown for the above-described operation, the BSDCNN− signal on the bus also goes to a binary ONE state. The BSDCNN− signal however is shown in FIG. 17, but for different purposes as described hereinafter. The setting of the MYDCNN+ signal resets the USRQST signal via gate 29 of FIG. 8. Nothing else happens in this interaction of signals until the second clock pulse appears.

As indicated hereinbefore, the generation of such clock pulse may change the state of the RDMDR signal. At such time, the clock stall CKSTL1 signal is generated and provided via OR gate 372 on line 316 to the control or stall input of the clock circuit of FIG. 12. This causes such clock circuit to enter such stalled state (i.e., the clock circuit is enabled for stalling), but an actual stall condition will not be generated, if in fact the CKSTL1 signal is reset to a binary ZERO essentially before the end of the present clock cycle. Such a resetting occurs if there is either an ACK or NAK signal received from the slave unit. It is again noted that three other signals may generate the clock pulse signal on line 316 via OR gate 372. The CKSTL2 signal will be discussed hereinafter.

Upon receipt of the slave's address and data from, for example, the central processor, the slave, by way of example the memory, may respond with an ACK signal, thereby resetting the MYDCNN+ signal and the MYREQT signal. If the response from the slave unit was a NAK signal, then the resetting of the MYREQT signal as well as the MYDCNN + signal would have also taken place. If the response was a WAIT signal from the slave, the MYDCNN+ signal would be reset, but the MYREQT signal would remain set. In response to the MYREQT signal going low, this resets flip-flop 366 thereby causing the CKSTL1 signal to go low, the deactivated state. If the CKSTL1 signal is deactivated during the clock cycle, in such event, the third clock pulse will not be caused to stall. Accordingly, it can be seen that the clock stall signal, i.e., the CKSTL1 signal in this case, has gone high and then low during the same clock cycle, i.e., clock cycle 2, following the clock cycle, i.e., clock cycle 1, in which the request was made for use of the bus, i.e., when the MYREQT signal went high. Since the CKSTL1 signal has gone low during clock cycle 2, there is no stall of the third clock pulse just before clock cycle 3.

Thus, in summary of FIG. 17, what has happened by way of example during clock cycles 1 and 2 is that a request was made for use of the bus which in fact was granted. In response to such request, by way of example, the central processor 206 has made a read request to memory 202. In making such request, the central processor has provided the address of the location in memory from which the data is to be read. At this point the central processor has executed what is required in order to receive a response from the memory. In response, as is seen by way of example, an ACK signal has been generated by the memory indicating to the central processor that in fact it has accepted the read request. Accordingly, at some later time, depending upon the speed of the memory and the extent of the use of the bus 200, a response will be provided by the memory for the second half of the read cycle, i.e., that half during which the memory forwards the addressed data to the central processor. If this was a write cycle, then this operation would be completed during the second clock cycle. However, for the read cycle, the requested data is expected at some future time. Before such data is expected, in the clock cycle preceding the clock cycle during which such return of data is expected in response to the read command, the central processor which expects such information must generate a signal so as to begin the stall of its clock in case the data is received later than expected. This is required so that the data when received will not be lost. No actual stall of a clock will take place unless in fact the data does not arrive during the expected clock cycle.

Thus, during clock cycle 3 after the central processor has made a read request, and has received an ACK response from the memory, the central processor will cause an MSTAL signal to be generated thereby causing the clock CKSTL2 signal to be generated. This happens at the leading edge of the fourth clock pulse as indicated in FIG. 17 at the time when the MSTAL signal is high so that such high state is clocked to produce the CKSTL2 signal at the output of flip-flop 374 which in turn is one of the inputs of OR gate 372 generating the stall signal on line 316.

The MSTAL signal is produced at the output of decoder 368 in response to the decode of bits 26 and 27 of the control store word. The control store word includes the correct states of the bits 26 and 27 to produce the MSTAL signal if addressed by means of the next address generation logic 354 in response to the test conditions received by test logic 356. Thus, again referring to FIG. 17, the MSTAL signal produced, which in turn reproduces the CKSTL2 signal at the leading edge of the fourth clock pulse, primes the clock circuit for stalling. After this point in time, the memory becomes a master unit when ready with the data and when it gains access to the bus by generating the BSDCNN+ signal, such generation being completely asynchronous with the read request generated by the processor. Upon receipt of the data from the memory, the processor will generate its MYACKR signal acknowledging receipt and as can be seen in FIG. 16, such signal via OR gate 376 resets the CKSTL 2 signal at the output of flip-flop 374. It is noted that if the memory had generated a NAK signal (BSNAKR) signal in response to the read request, the CKSTL2 signal would have also been reset for such condition. Thus as can be seen, the only time that the CKSTL2 signal will not be reset in response to a signal from memory is when the memory generates a WAIT signal indicating that the memory is temporarily busy but will be responding in the immediate future. In such case it becomes beneficial for the processor to stall its clock for receipt of such information from memory. Otherwise it is possible that the information from memory may not have arrived when the processor is ready to use it. Following the resetting of the CKSTL2 signal, further operations will commence at the beginning of a fifth clock pulse.

Now referring to FIG. 18, the operation of the apparatus of FIG. 16 is shown when there is an actual stall in the system. Such stall conditions are shown as occurring during what is referred to as clock cycles 2 and 4. Control store bit 27 being in the binary ONE state causes the RDMDR signal, the MYDRD signal and the USRQST signals to go from a binary ZERO state to a binary ONE state as was the case in FIG. 17. The USRQST signal causes the MYREQT signal to go to a binary ONE state and when the master unit, in this case by way of example the central processor, gains priority to the bus, generates its own MYDCNN+ signal and in turn the signal BSDCNN− as shown in FIG. 8. By way of example, assuming that the memory is not ready to acknowledge with a positive acknowledgement, in such case of the memory is only temporarily busy, it will issue a WAIT signal which in turn will cause the MYDCNN+ signal to go low by resetting flip-flop 22 via gate 21 as shown in FIG. 8. The MYDCNN+ signal will again be generated when the master gains priority to the bus. In the interim, the WAIT signal will have gone low. At the leading edge of the second clock pulse, the RDMDR signal goes low because register 352 may be changed to contain the contents of the next firmware word. Also, at the leading edge of the second clock pulse, the binary ONE state of the CKSTL1 signal is generated.

During the second time interval or clock cycle, the next operation to occur is that the master unit, in this case the central processor, has gained access to the bus and the binary ONE state of the MYDCNN+ signal has been generated. At this time, the CKSTL1 signal is still in the binary ONE state and accordingly at the time that the third clock pulse should have occurred, the clock begins its actual stall so as to delay the third clock pulse. This accordingly accounts for the delay which was generated in the system because of the WAIT condition generated by the memory. Assuming that the memory unit responds with an ACK signal, the BSACKR+ signal goes high causing the MYDCNN+ signal generated by the central processor to go low. The ACK response also causes the MYREQT signal to go low which in turn causes the CKSTL1 signal to go low by resetting of flip-flop 366 of FIG. 16. The ACK signal also causes the MYDRD signal to go low.

By this example therefore, as shown in the first part of FIG. 18, the clock stall has actually taken place so that the time period 2 is greater than the time period 1 for example. This is so because the MYDCNN+ signal had to be generated twice due to the WAIT condition generated by the slave or memory in this case. Thus the third clock pulse has been moved out in time in an adaptive manner so as to ensure that the slave unit has received the read or write request in this case as indicated by the ACK signal returned from the slave unit.

For example where the return of data is expected, e.g., a read command, the control store is directed, as discussed above, to generate a stall enable signal the clock cycle before the data is expected, thereby the MSTAL signal goes high as decoded by decoder 368, and while it is still high, at the leading edge of the next clock pulse, in this case the fourth clock pulse, the high state of the MSTAL signal is clocked into flip-flop 374 to produce the high state of the CKSTL2 signal. Thus a stall condition is enabled but an actual stall has not yet been produced. It can be seen in FIG. 18, that the slave unit has not been able to gain priority with the bus 200 as shown by the delayed BSDCNN+ signal. Accordingly in this case, the CKSTL2 signal continues to cause the clock circuit to stall the clock cycle and accordingly produces an actual stall. Once the memory in this case gains access to the bus, and if the central processor is not busy, the central processor will generate an ACK signal when the data is received, thereby, via OR gate 376 resetting flip-flop 374 and accordingly causing the CKSTL2 signal to go to a binary ZERO state. Further operations continue thereafter at the leading edge of the fifth clock pulse.

In the example chosen wherein the central processor is communicating with the memory, the memory unit as discussed hereinbefore may have been the highest priority unit and so accordingly, there would typically not be a stall in interval four, because of the fact that the memory is the highest priority and would gain access to the bus before any other lower priority unit. However, there may be an overlap in the clock cycles of the various units which are communicating on the bus, accordingly the memory would have to wait unitl the completion of the clock cycle presently executing at the time it makes its request for the bus. This operation has been seen with respect to the logic of FIG. 8. Further it is possible that the central processor may have for some reason (error condition, etc.) not produced an ACK signal, thereby not resetting the CKSTL2 signal.

While the invention has been particularly shown and described with reference to preferred embodiments thereof, it will be understood by those skilled in the art that the foregoing and other changes in form and details may be made therein without departing from the spirit and scope of the invention.

Having described the invention, what is claimed as new and novel and for which it is desired to secure Letters Patent is:

1. Data transfer apparatus comprising:
 A. clock means, having a control input and an output, for providing a stream of clock pulses at said output, said clock means including means for inhibiting the generation of said clock pulses in response to the presence of a stall signal at said control input at a time when one of said clock pulses should have occurred, said stall signal having no effect on the generation of said clock pulses if said stall signal is received after the occurrence of a said clock pulse and is no longer present at a time when a next one of said clock pulses should normally be generated;
 B. a plurality of units, including a first unit and a second unit, said clock means included in said first unit;
 C. a common electrical bus coupled with each of said units for enabling the transfer of information between said units;
 D. means, included in said first unit, for generating a first signal indicating a request for the use of said bus;
 E. means for generating a second signal indicating the granting to said first unit of the use of said bus;
 F. means, included in said first unit and responsive to said second signal, for transferring information over said bus to said second unit;
 G. stall signal generating means, responsive to said first signal and the next occurring one of said clock pulses, for generating a first said stall signal;
 H. means for coupling said first said stall signal for receipt by said control input of said clock means;
 I. means, included in said second unit and responsive to said information transferred from said first unit, for providing a positive acknowledgement over said bus to said first unit, indicating that said second unit has accepted said information;
 J. means, included in said first unit and responsive to said positive acknowledgement, for disabling said stall signal generating means, thereby removing said first said stall signal from said control input; and
 K. means, included in said clock means, for enabling the generation of a said clock pulse in response to the said removal of a said stall signal from said control input.

2. The combination as in claim 1 wherein said clock means further comprises means responsive to the removal of said stall signal from said control input, for generating a said clock pulse with substantially no delay if said stall signal was present at said control input at the time when a said clock pulse should have been generated.

3. The combination as in claim 1 further comprising:
 A. means, included in said second unit, and responsive to said information transferred from said first unit, for providing a negative acknowledgement over said bus to said first unit, indicating that said second unit is busy and has not accepted said information; and
 B. means, included in said first unit and responsive to said negative acknowledgement, for disabling said stall signal generating means thereby removing said first said stall signal from said control input.

4. The combination as in claim 1 further comprising

A. means, included in said second unit and responsive to said information transferred from said first unit, for providing a quasi-negative acknowledgement over said bus to said first unit, indicating that said second unit is temporarily busy and has not accepted said information; and B. means, included in said first unit and responsive to said quasi-negative acknowledgement, for reenabling said means for generating said first signal thereby again requesting the use of said bus without disabling said stall signal generating means, whereby said first said stall signal remains at said control input until said positive acknowledgement is received by said first unit.

5. The combination as in claim 1 wherein said information transferred from said first unit to said second unit includes a request for receipt of other information from said second unit, said combination further comprising:

A. means, included in said first unit, for generating a second said stall signal prior to the receipt of said other information from said second unit; and B. means for coupling said second said stall signal for receipt by said control input of said clock means.

6. The combination as in claim 5 further comprising:

A. means, included in said first unit and responsive to the receipt of said other information from said second unit, for generating a positive acknowledgement signal; and B. means, included in said first unit and responsive to said positive acknowledgement signal, for disabling said means for generating from generating said second said stall signal.

7. The combination as in claim 6 further comprising:

A. means, included in said second unit and responsive to said information transferred from said first unit, for providing a negative acknowledgement over said bus to said first unit, indicating that said second unit is busy and has not accepted said information; and B. means, included in said first unit and responsive to said negative acknowledgement, for disabling said means for generating from generating said second said stall signal.

8. The combination as in claim 1 wherein said information transferred from said first unit to said second unit includes a request for receipt of other information from said second unit, said combination further comprising:

A. means for generating a preliminary signal indicating that the receipt of said other information is expected from said second unit;

B. further stall signal generating means, responsive to said preliminary signal and the next occurring one of said clock pulses, for generating a second said stall signal; and C. means for coupling said second said stall signal for receipt by said control input of said clock means.

9. The combination as in claim 8 further comprising:

A. means, included in said first unit and responsive to the receipt of said other information from said second unit, for generating a positive acknowledgement signal; and B. means, included in said first unit and responsive to said positive acknowledgement signal, for disabling said means for generating from generating said second said stall signal.

10. The combination as in claim 9 further comprising:

A. means, included in said second unit and responsive to said information transferred from said first unit, for providing a negative acknowledgement over said bus to said first unit, indicating that said second unit is busy and has not accepted said information; and B. means, included in said first unit and responsive to said negative acknowledgement, for disabling said stall signal generating means and said further stall signal generating means, thereby respectively removing said first and stall signal or said second said stall signal, whichever is present at said control input, from said control input.

11. The combination as in claim 10 further comprising:

A. input register means, included in said first unit, for receiving said other information from said bus; and B. means, included in said first unit and responsive to said positive acknowledgement signal, for enabling the temporary storage of said other information in said input register means.

12. The combination as in claim 11 further comprising:

A. output register means, included in said first unit, for temporarily storing said information before transfer to said second unit;

B. means, included in said first unit, for indicating that said information is ready for transfer; and C. means, included in said first unit and responsive to said means for indicating that said information is ready for transfer, for enabling the temporary storage of said information in said output register means.

* * * * *